United States Patent
Lee et al.

(10) Patent No.: US 9,888,504 B2
(45) Date of Patent: Feb. 6, 2018

(54) BLUETOOTH CONNECTION METHOD AND APPARATUS

(71) Applicant: LG ELECTRONICS INC., Seoul (KR)

(72) Inventors: Jaeho Lee, Seoul (KR); Minsoo Lee, Seoul (KR); Younghwan Kwon, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/314,765

(22) PCT Filed: May 11, 2015

(86) PCT No.: PCT/KR2015/004676
§ 371 (c)(1),
(2) Date: Nov. 29, 2016

(87) PCT Pub. No.: WO2015/182896
PCT Pub. Date: Dec. 3, 2015

(65) Prior Publication Data
US 2017/0215213 A1    Jul. 27, 2017

Related U.S. Application Data

(60) Provisional application No. 62/004,908, filed on May 30, 2014.

(51) Int. Cl.
*H04W 76/02* (2009.01)
*H04W 4/00* (2009.01)
(Continued)

(52) U.S. Cl.
CPC .......... *H04W 76/021* (2013.01); *H04L 43/16* (2013.01); *H04L 61/20* (2013.01); *H04W 4/008* (2013.01);
(Continued)

(58) Field of Classification Search
CPC ........................ H04W 76/021; H04W 4/008
See application file for complete search history.

(56) References Cited

U.S. PATENT DOCUMENTS

2004/0038645 A1* 2/2004 Rcunamaki .......... H04W 16/14
455/41.2
2008/0058031 A1  3/2008 Deprun

FOREIGN PATENT DOCUMENTS

KR   10-2007-032735 A    3/2007
KR   10-2007-0098127 A   10/2007
(Continued)

Primary Examiner — Tuan H Nguyen
(74) Attorney, Agent, or Firm — Birch, Stewart, Kolasch & Birch, LLP

(57) ABSTRACT

The present invention is related to a method and an apparatus for avoiding collision in a Bluetooth reconnection procedure. A method and an apparatus according to the present invention comprises measuring energy level of a received signal transmitted through a first channel; changing the first channel to the second channel when the energy level is larger than a predetermined threshold value; transmitting a trigger packet to a second device through the second channel; receiving a beacon packet through the second channel from the second device; and establishing a connection with the second device, wherein the first device stores information related to Bluetooth connection with the second device.

11 Claims, 27 Drawing Sheets

(51) Int. Cl.
*H04W 24/08* (2009.01)
*H04L 12/26* (2006.01)
*H04L 29/12* (2006.01)

(52) U.S. Cl.
CPC ......... *H04W 24/08* (2013.01); *H04L 61/6022* (2013.01)

(56) References Cited

FOREIGN PATENT DOCUMENTS

| KR | 10-2008-0020572 A | 3/2008 | | |
|---|---|---|---|---|
| KR | 10-2008-0088886 A | 10/2008 | | |
| KR | 20080088886 | * 10/2008 | ............... | H04B 7/24 |
| KR | 10-2010-0070875 A | 6/2010 | | |

* cited by examiner

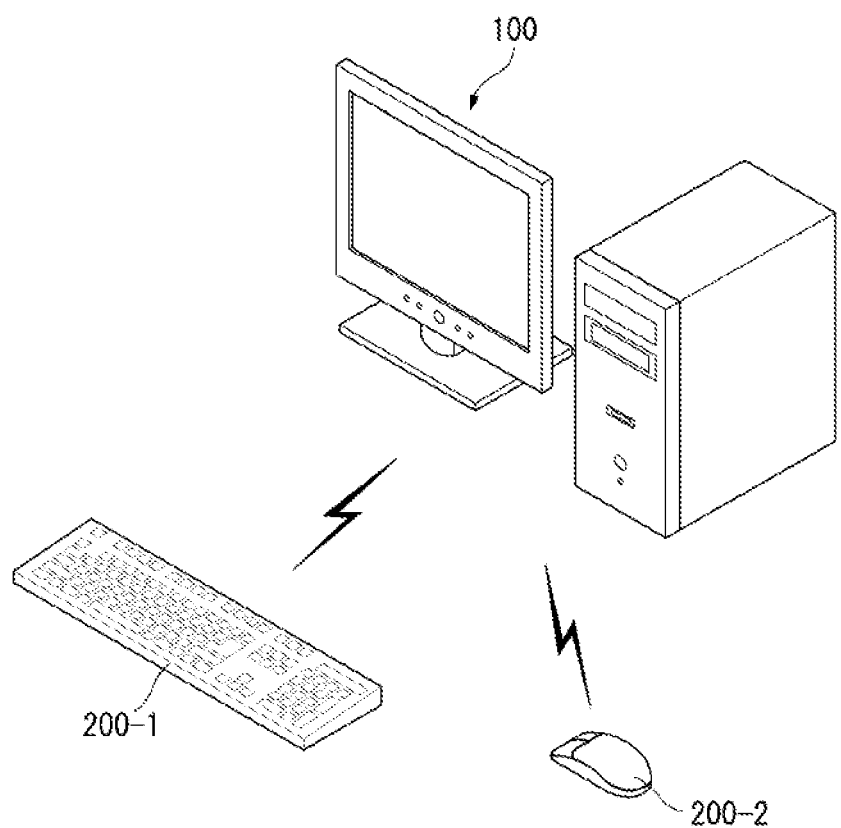
[Fig.1]

[Fig.2]
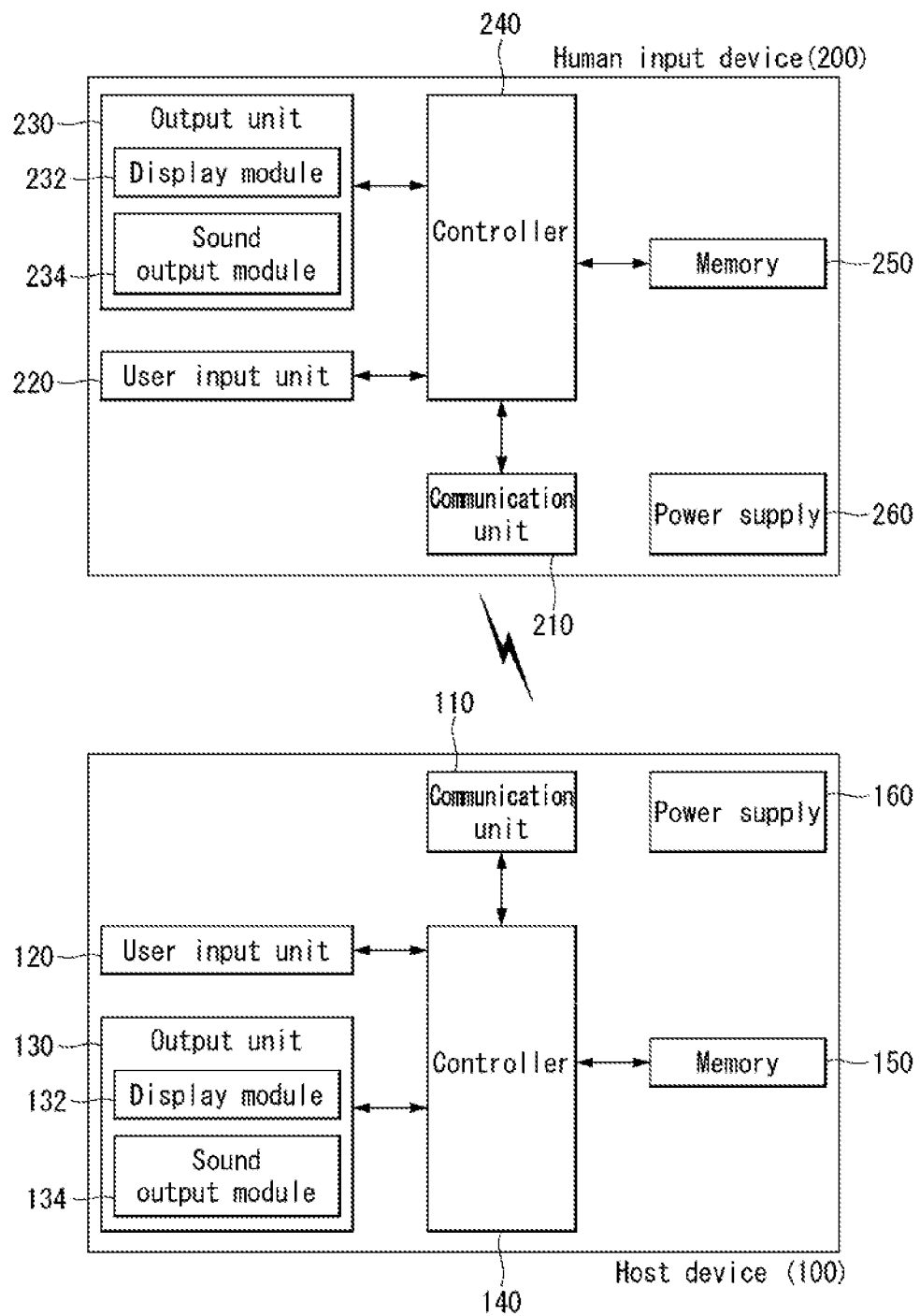

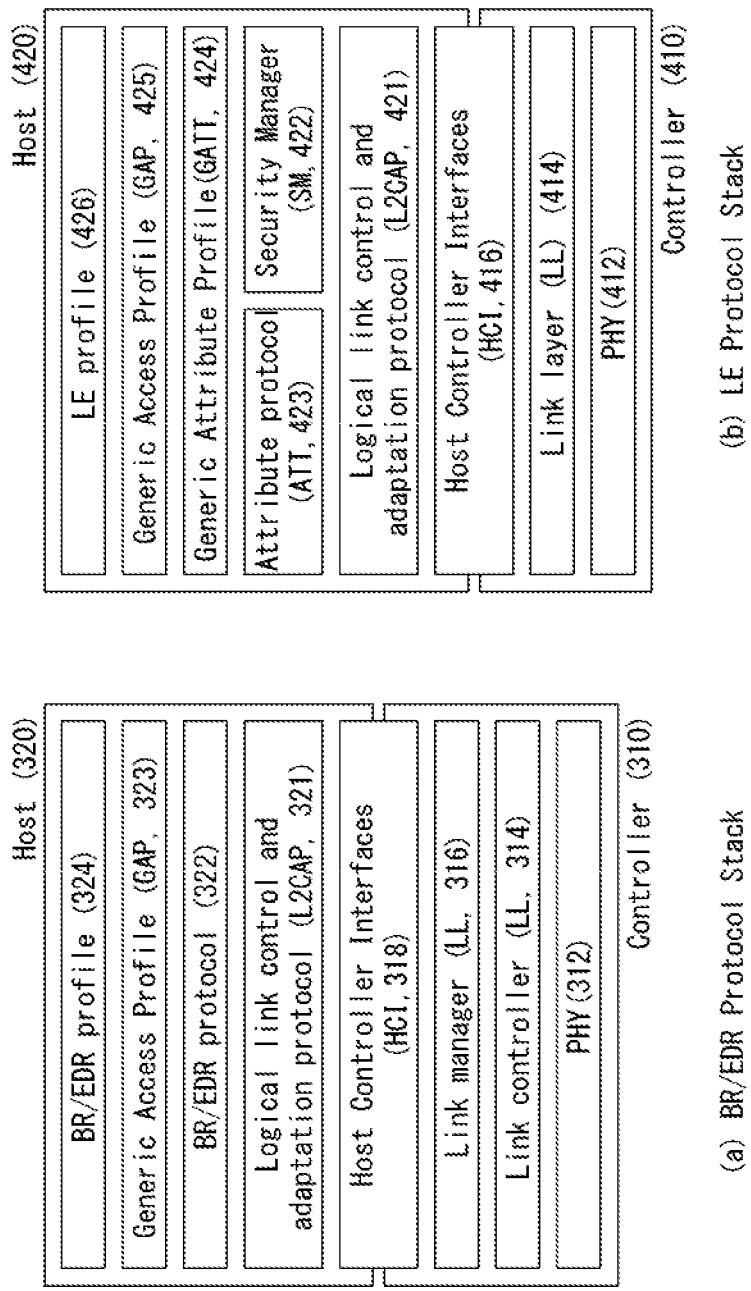

[Fig.4]
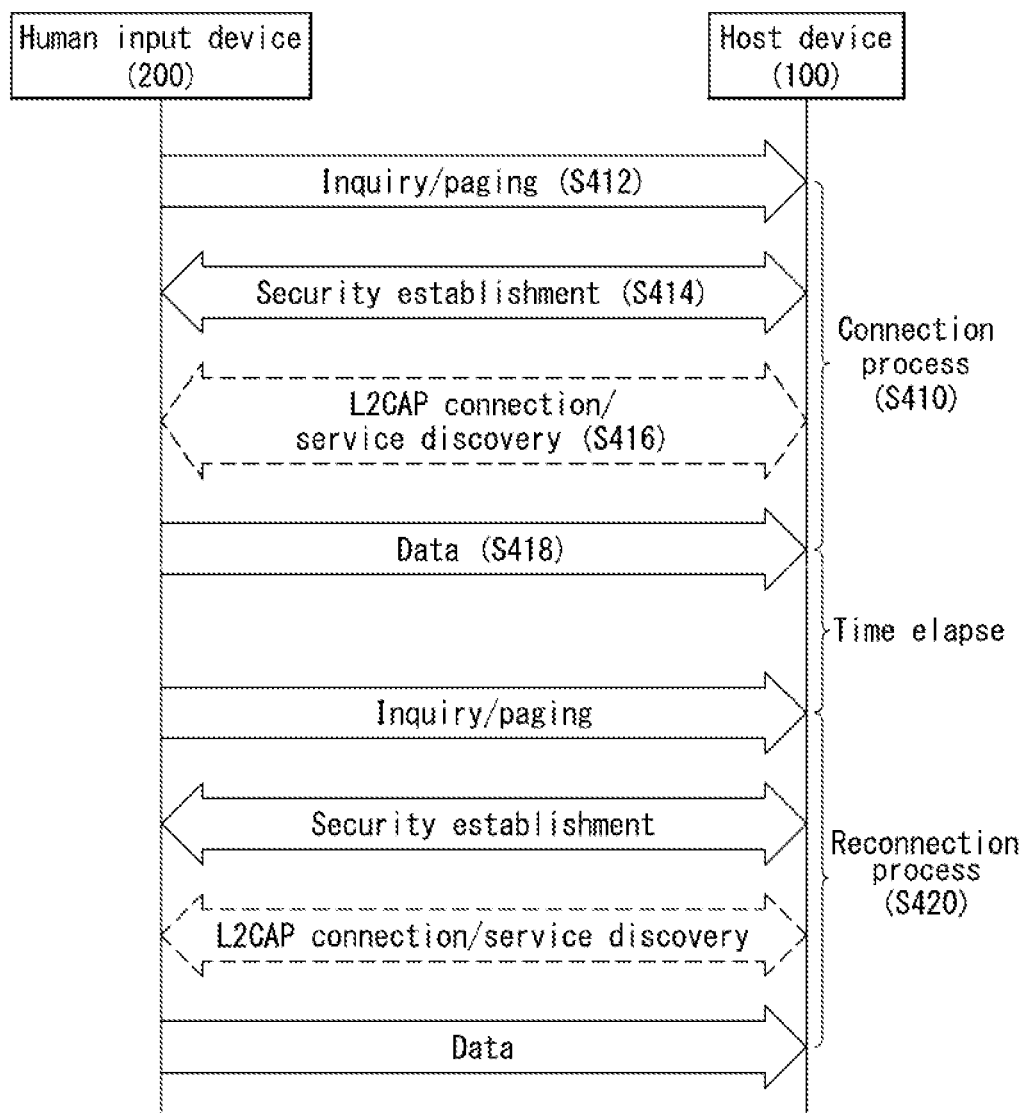

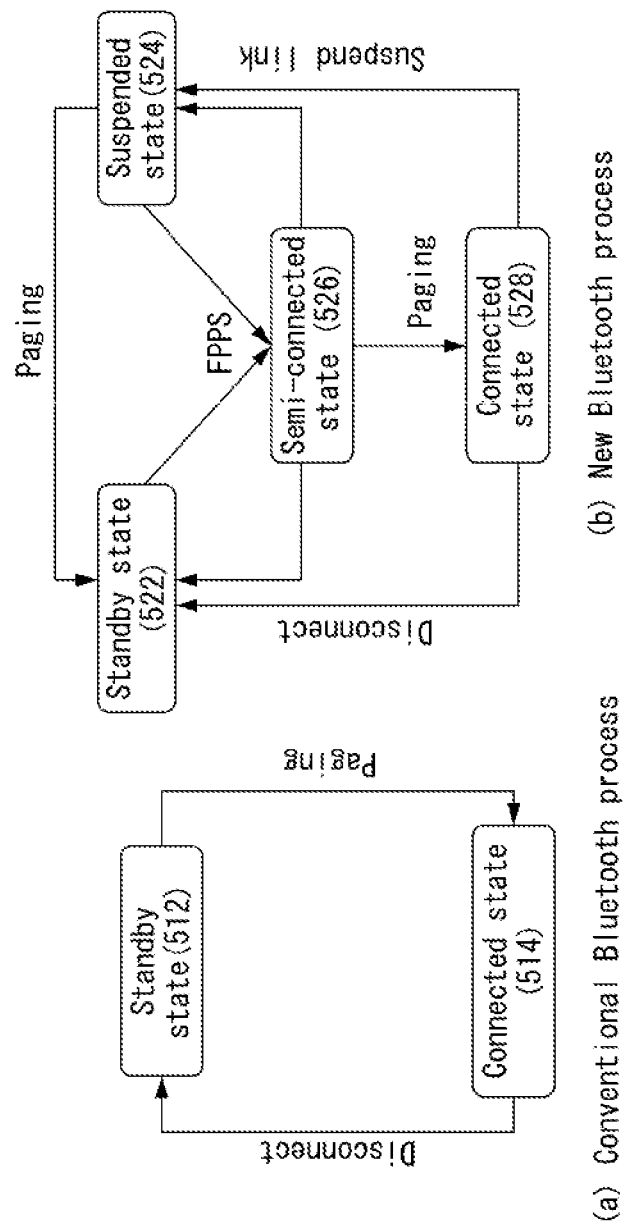

[Fig.6]
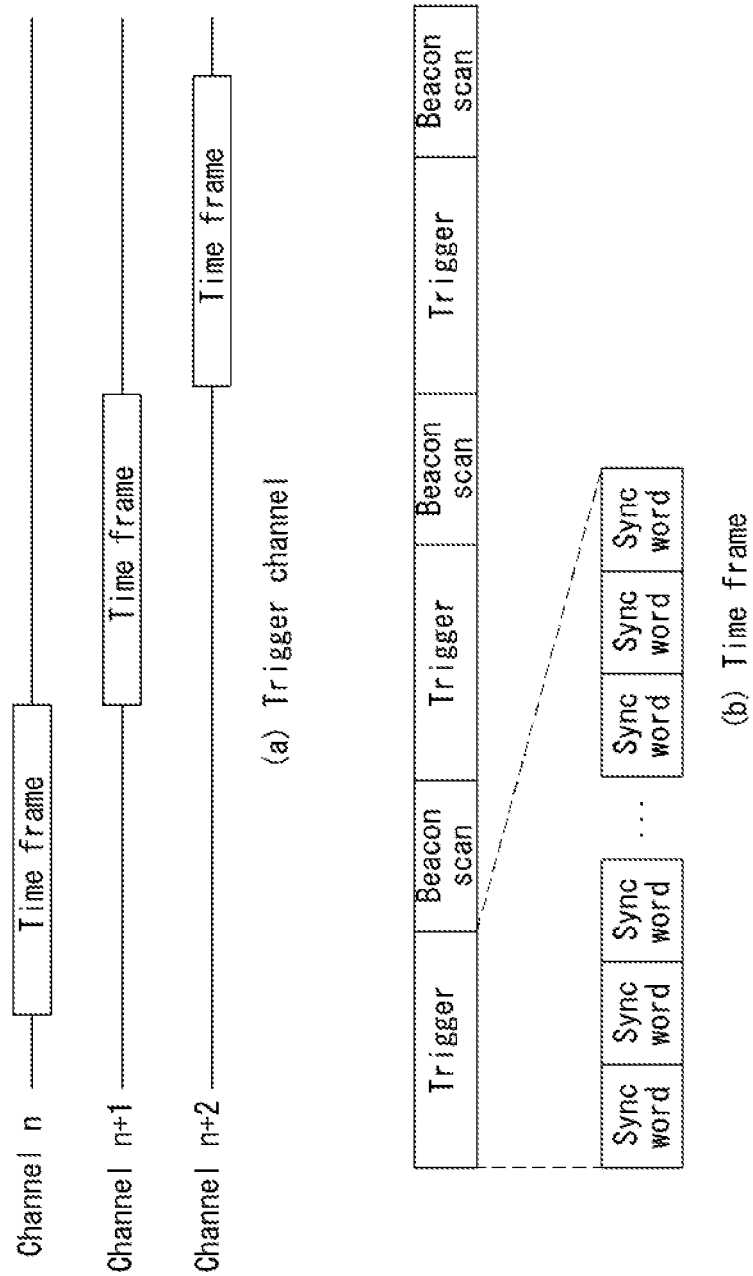

[Fig.7]
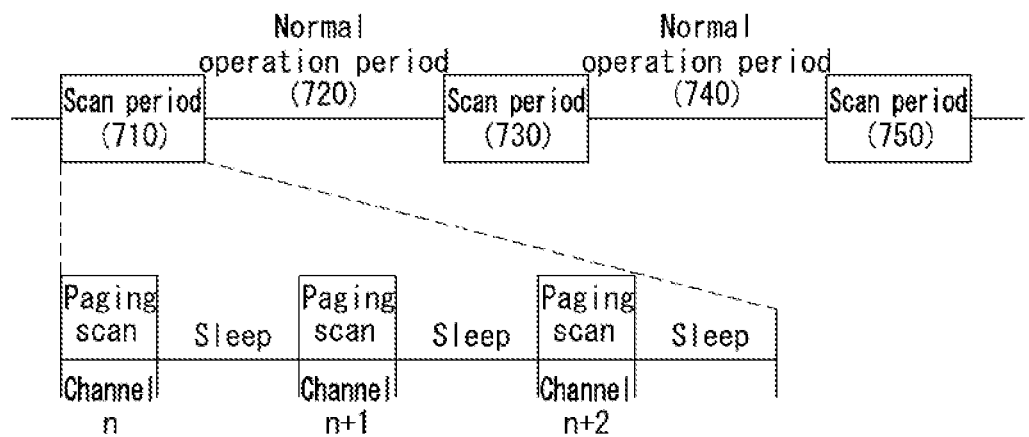
[Fig.8]
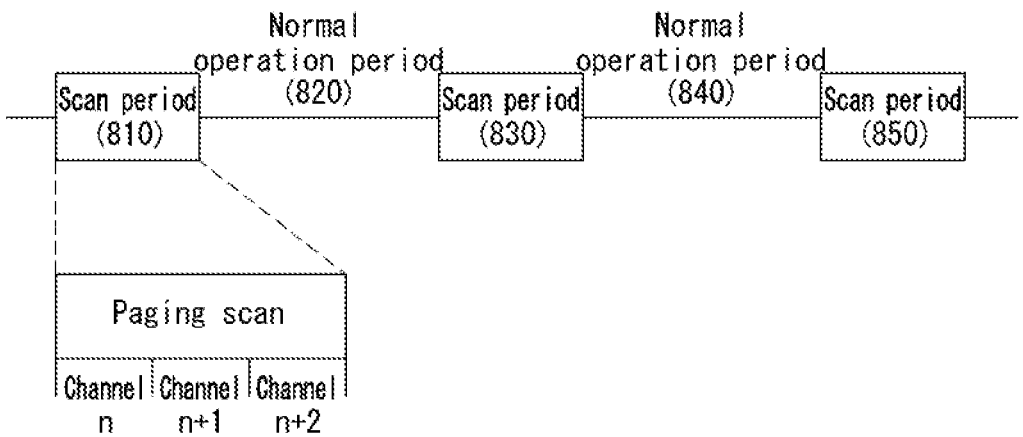

[Fig.9]
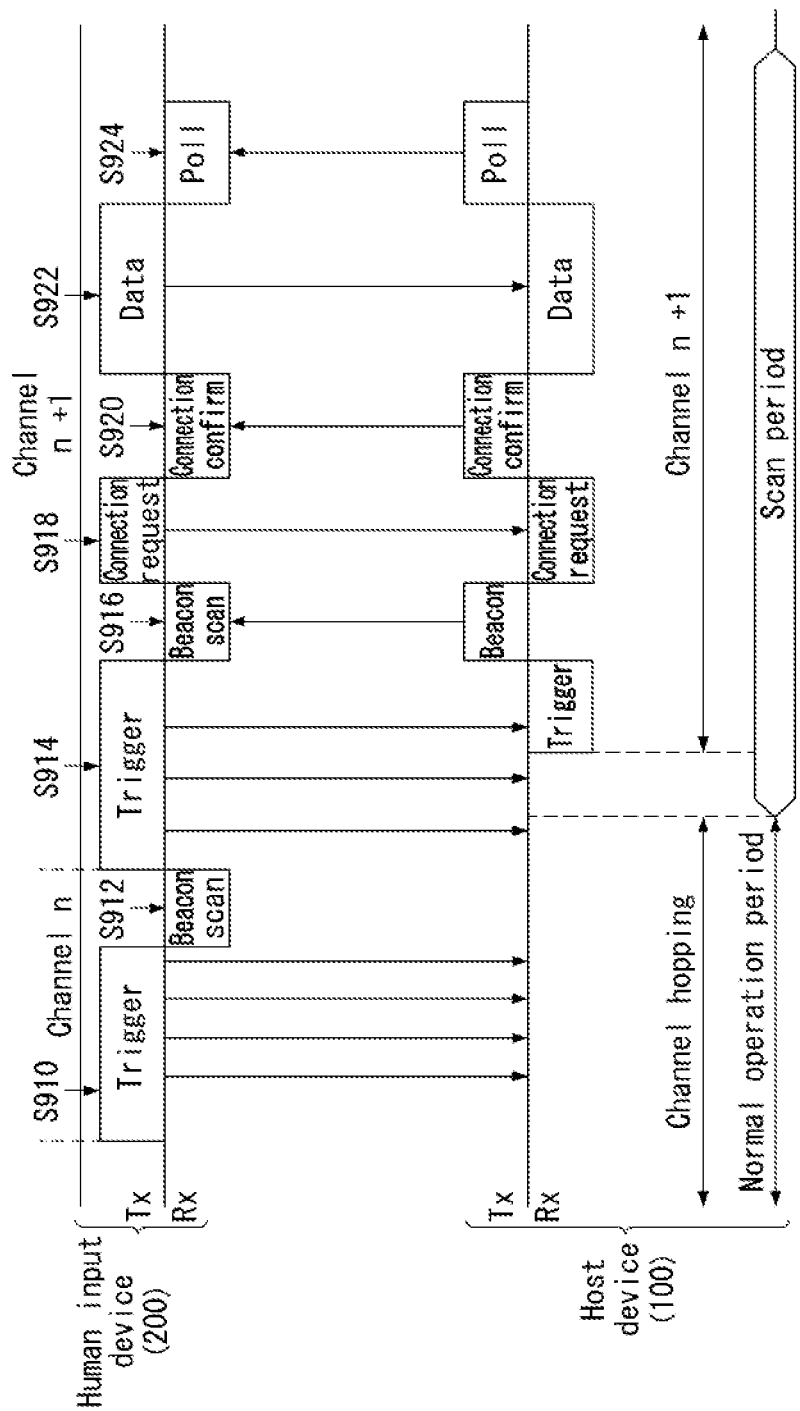

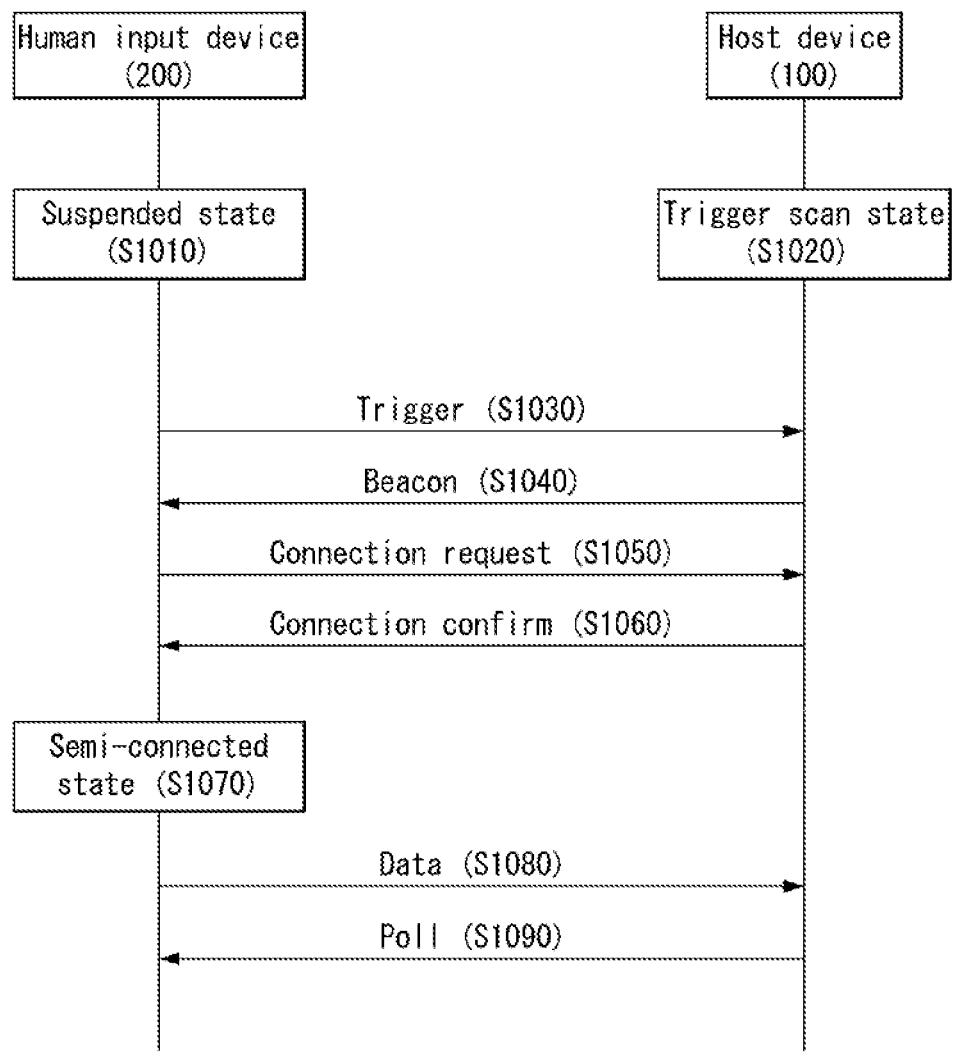
[Fig.10]

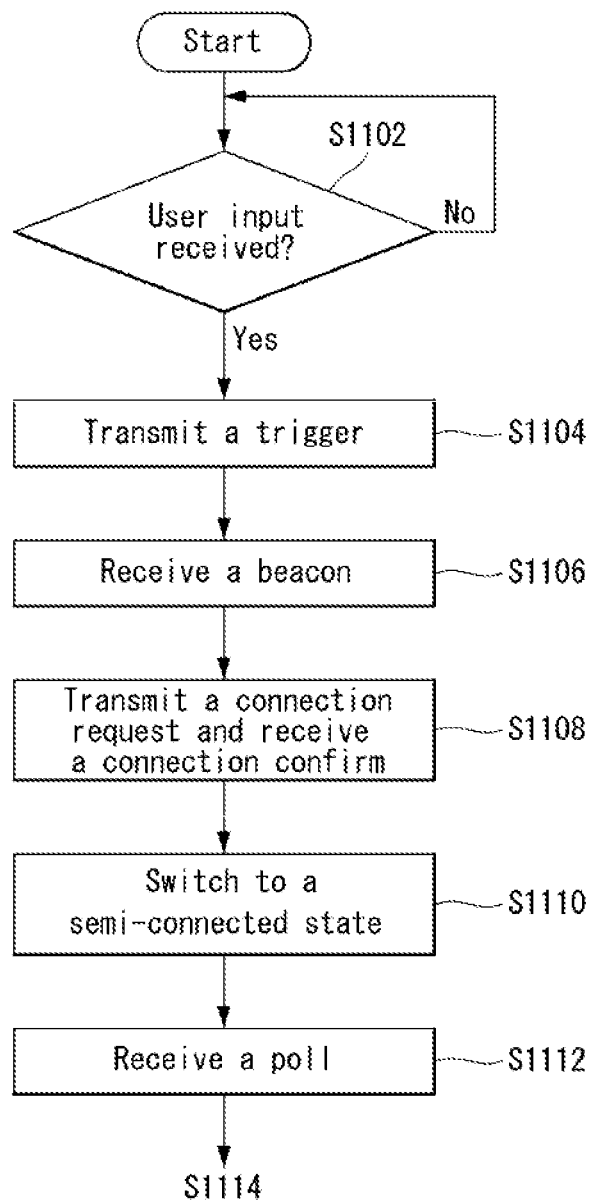

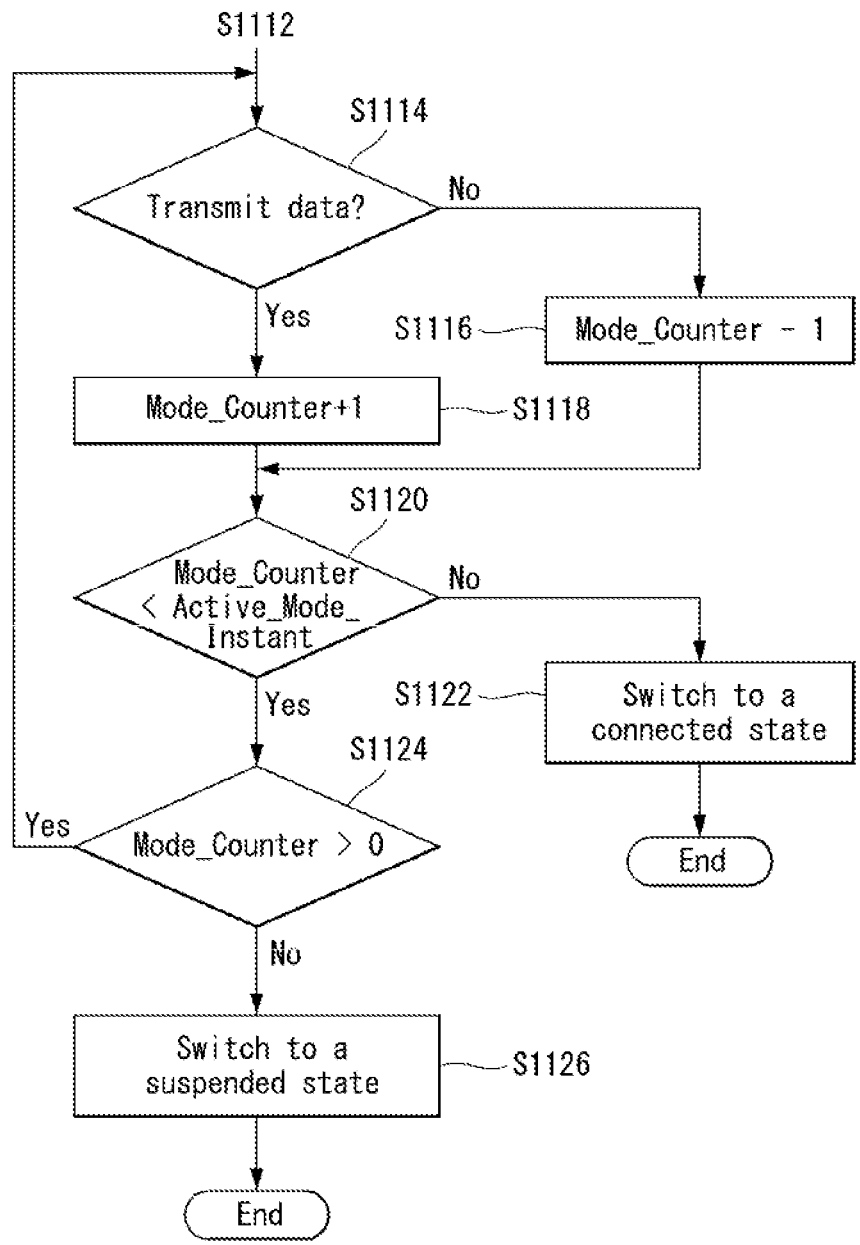
[Fig.11b]

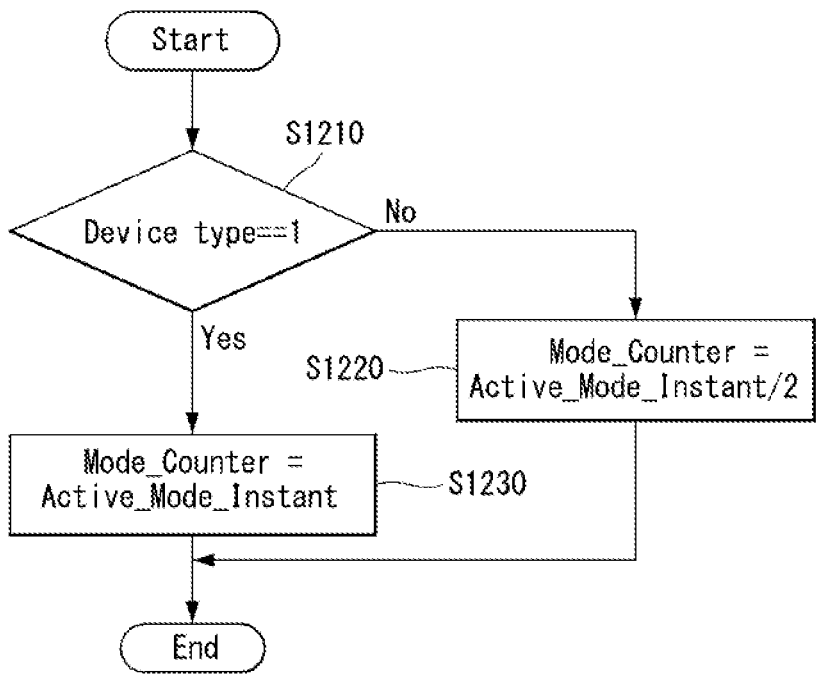
[Fig.12]

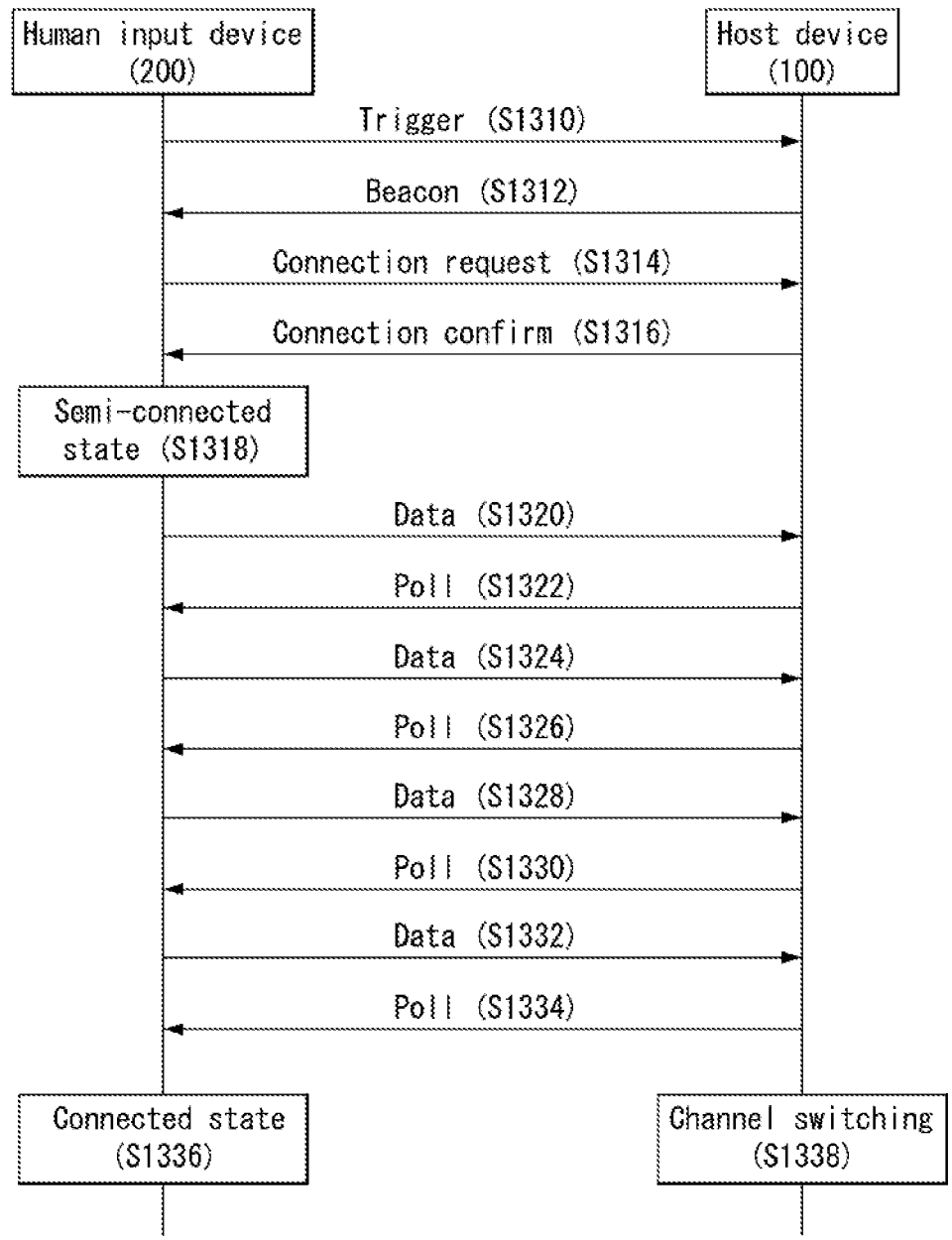
[Fig.13]

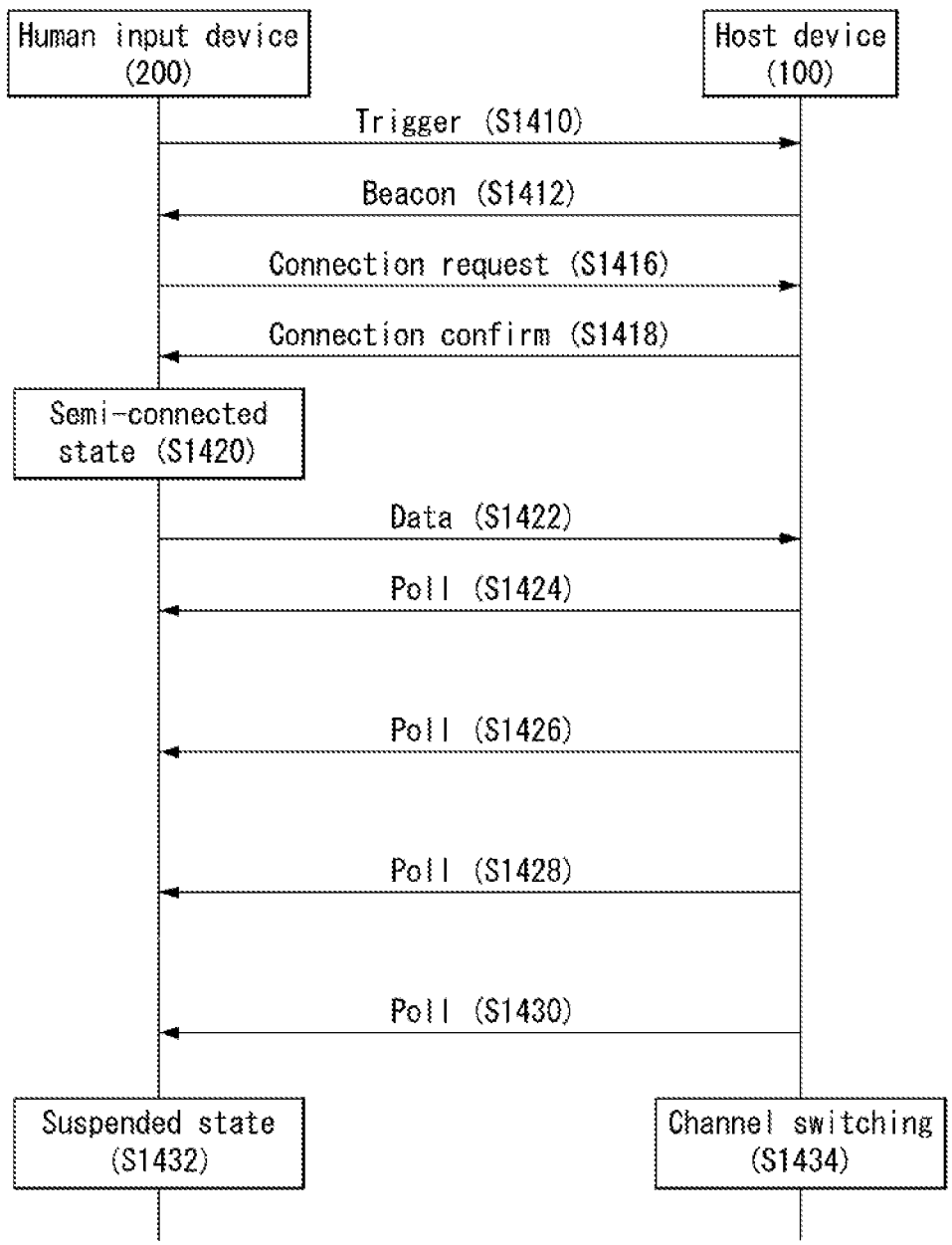

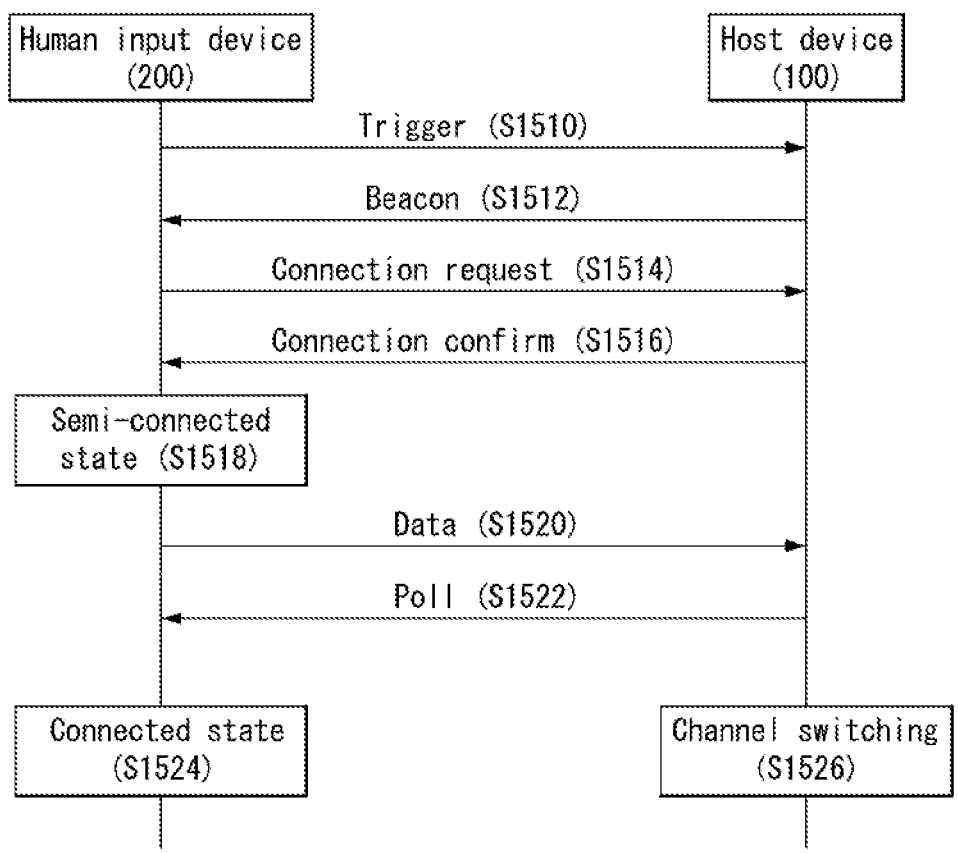
[Fig.15]

[Fig.16]
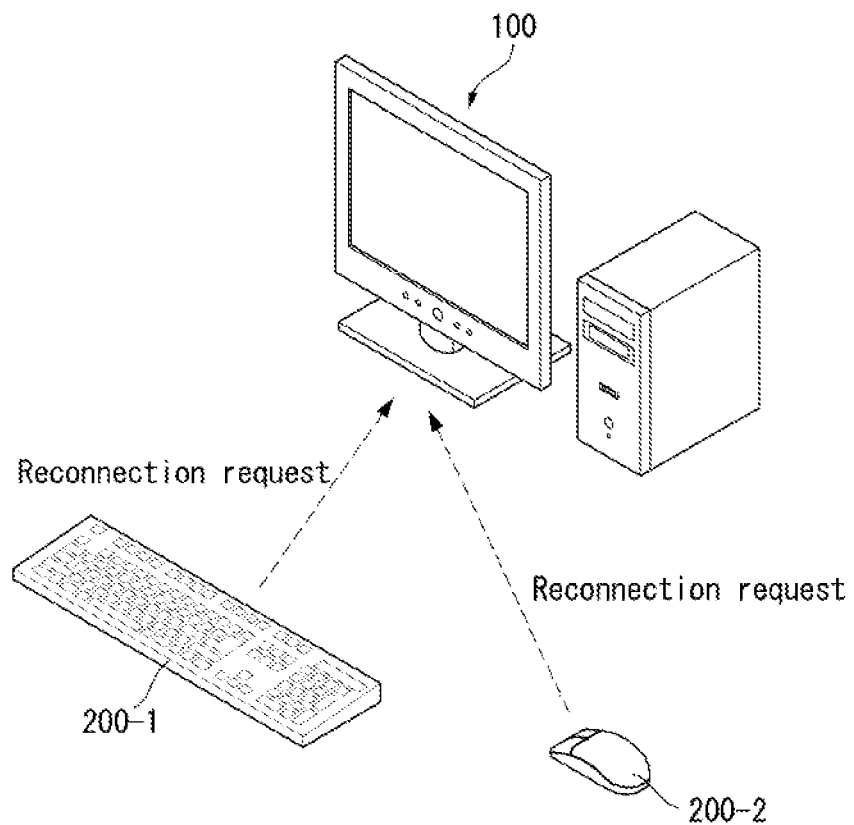

[Fig.17a]
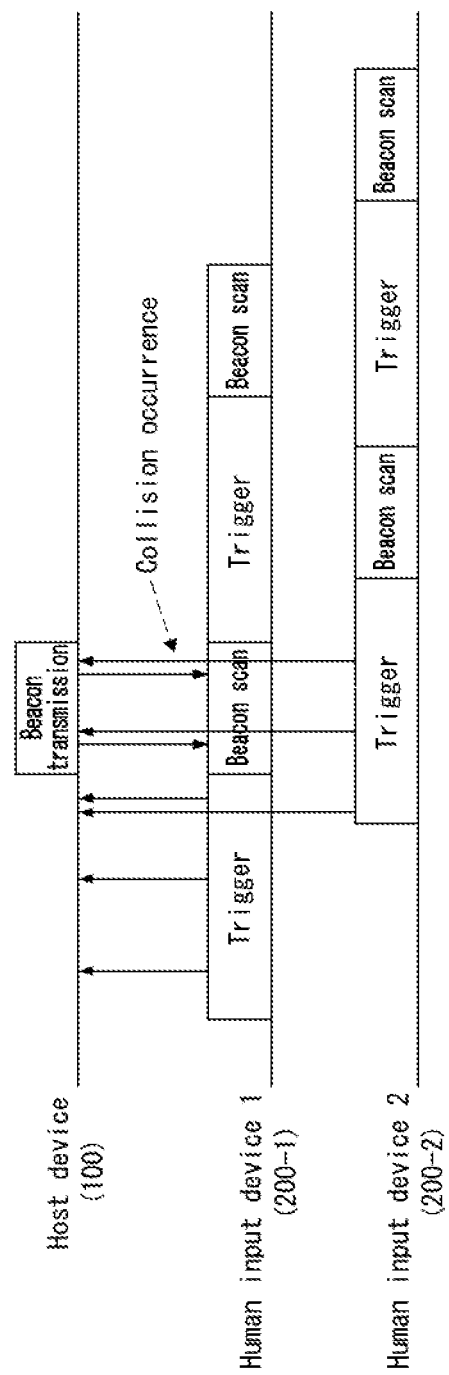

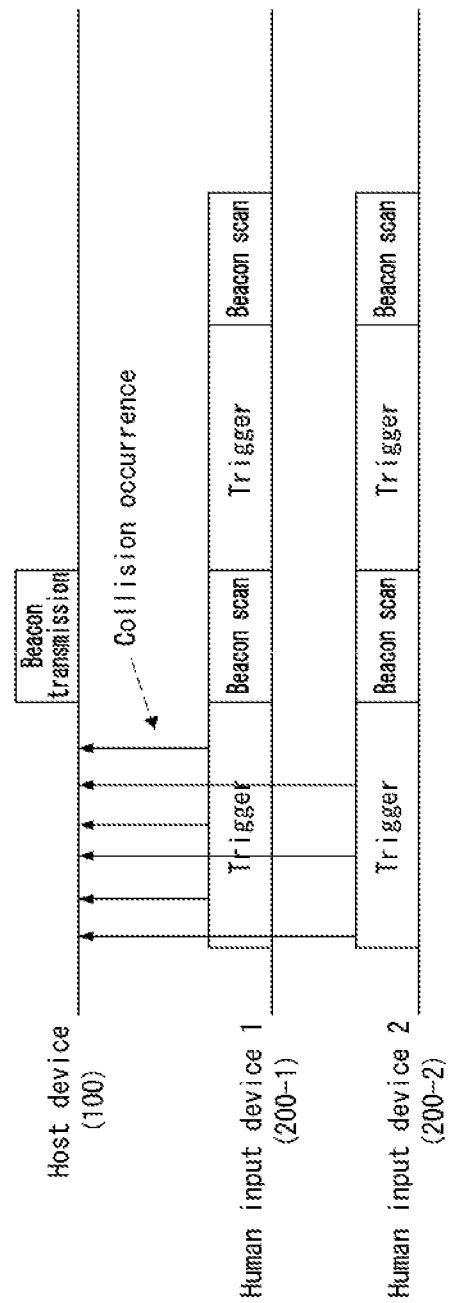
[Fig.17b]

[Fig.18]
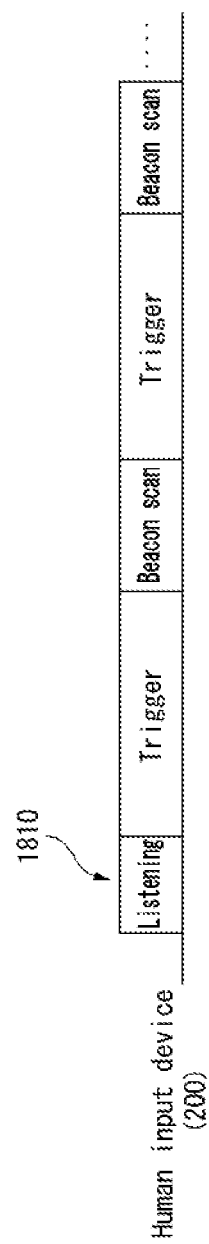

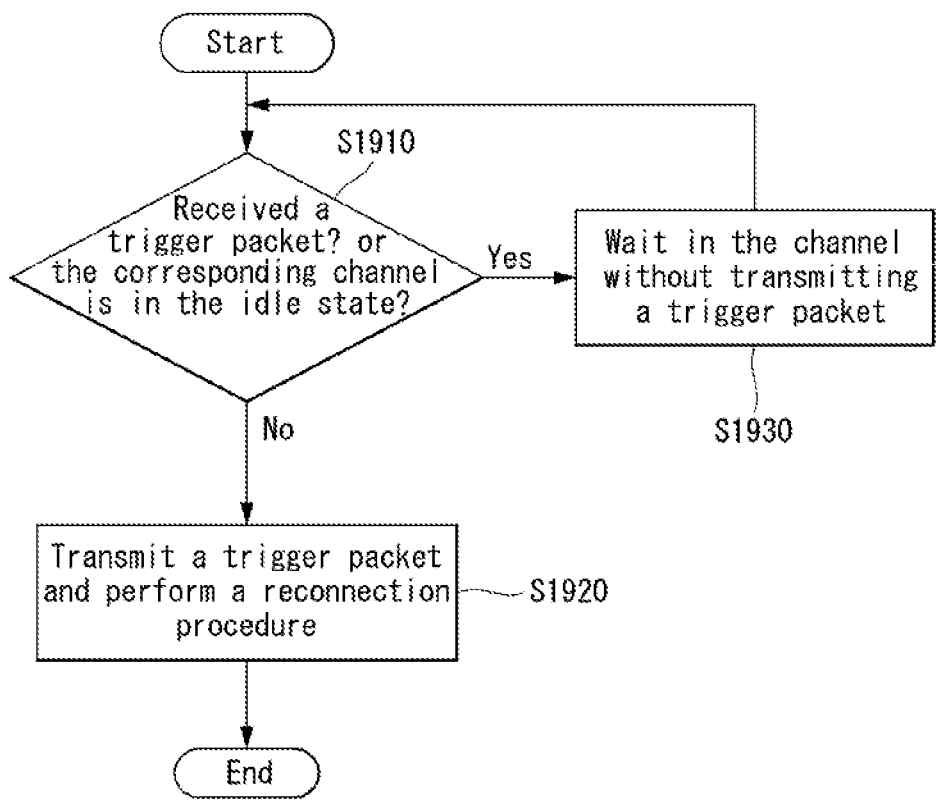
[Fig.19]

[Fig.20]
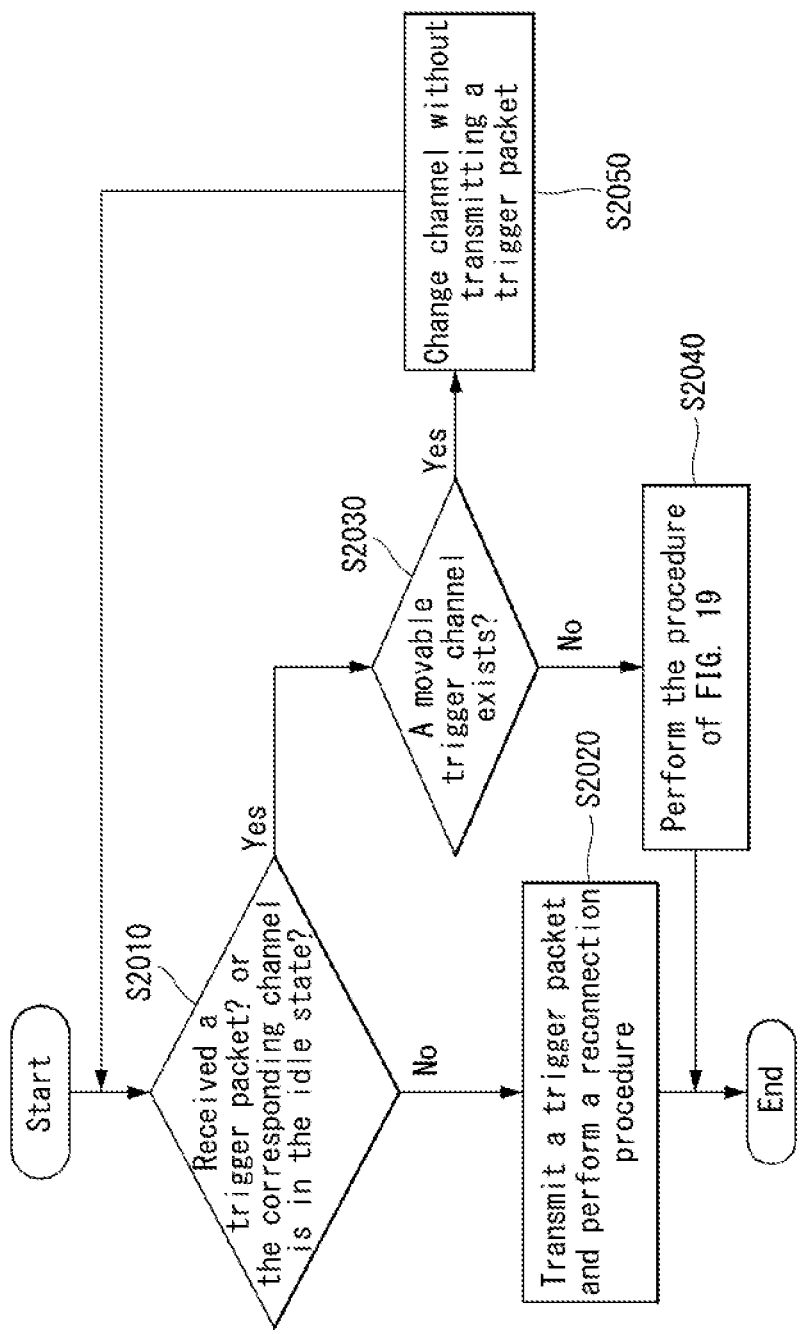

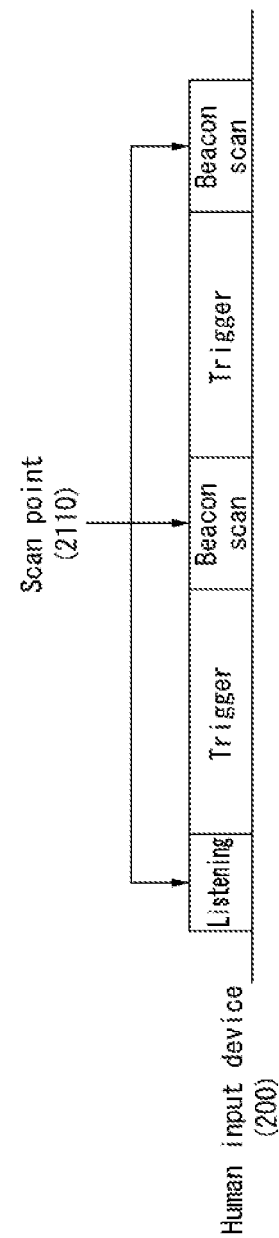
[Fig.21]

[Fig.22]
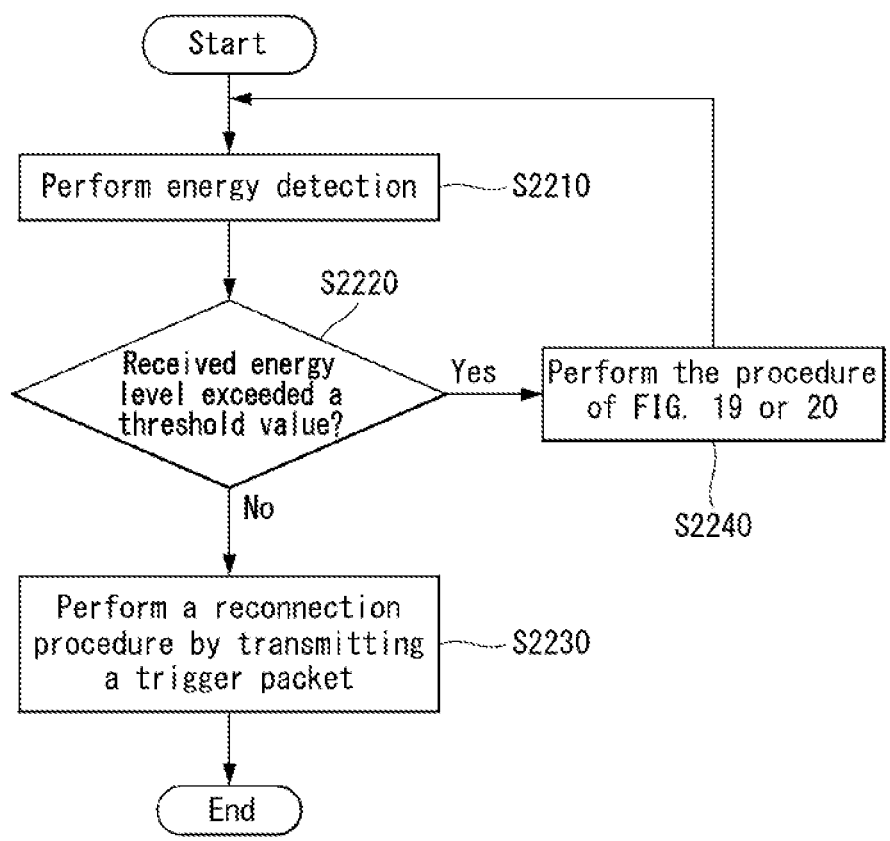

[Fig.23]
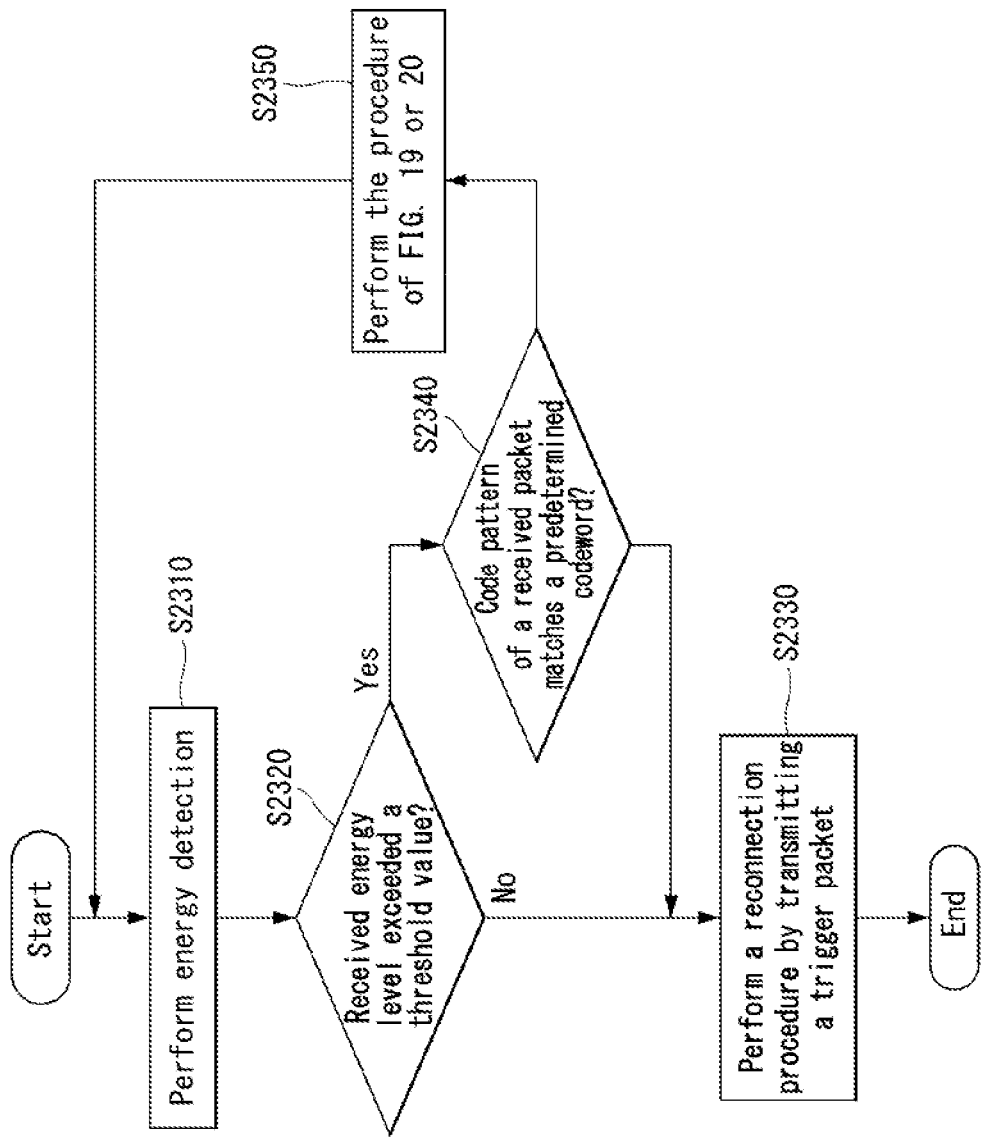

[Fig.24]
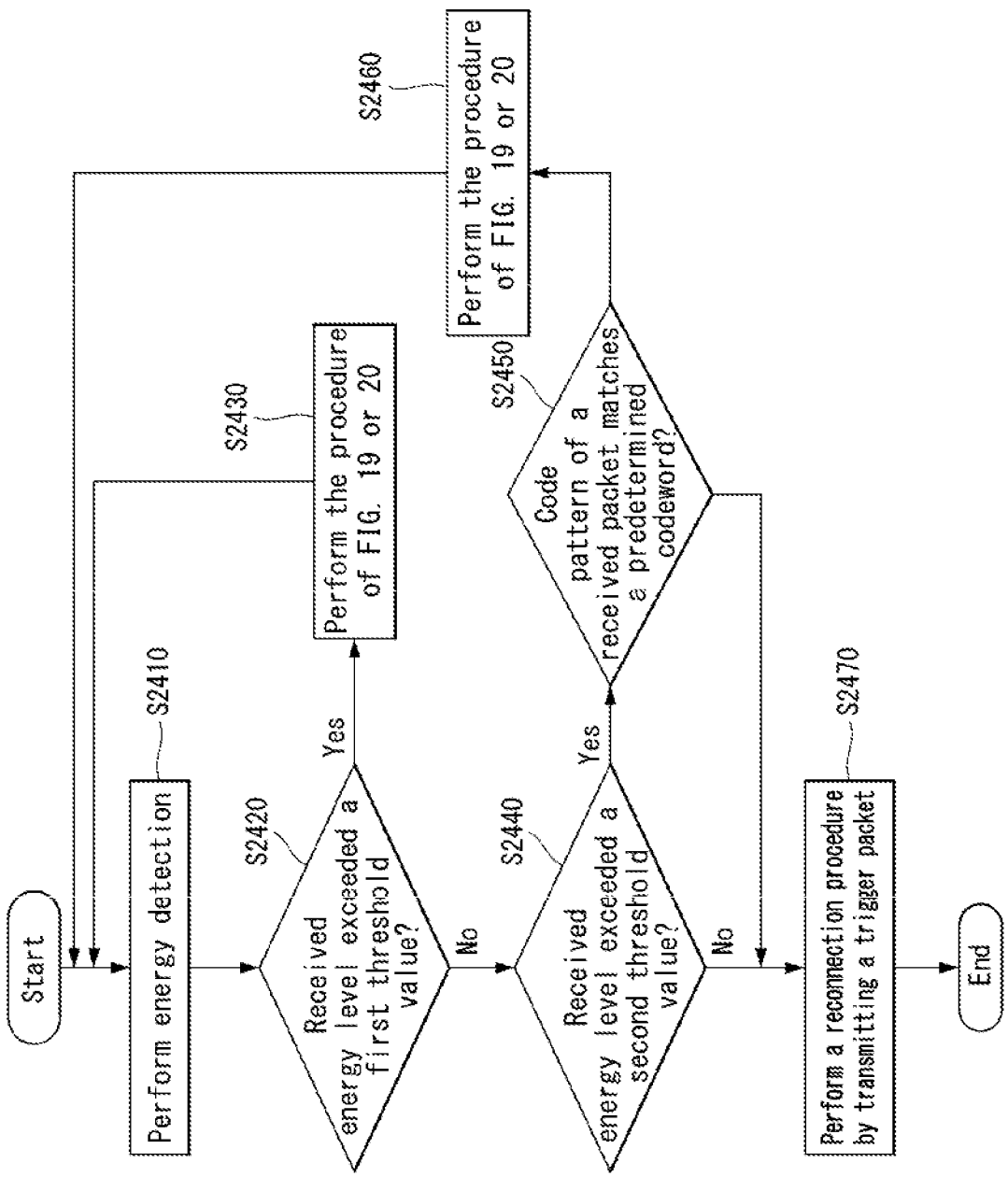

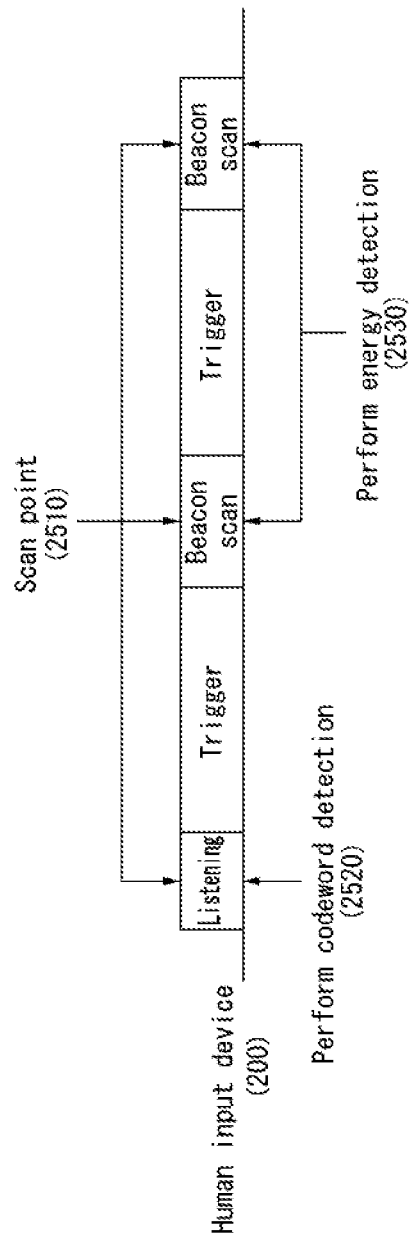
[Fig.25]

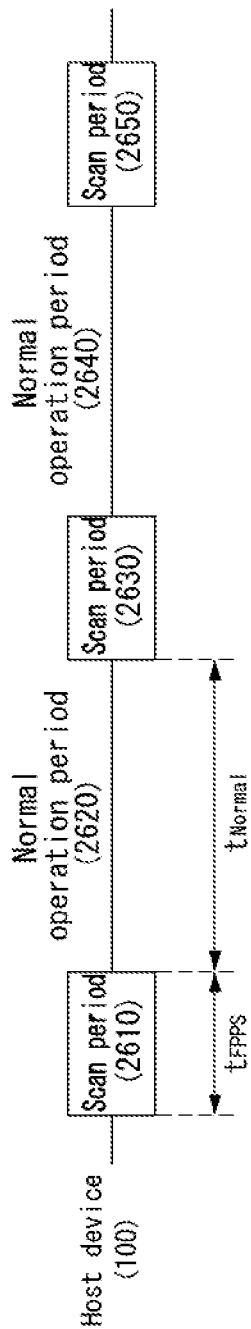
[Fig.26]

BLUETOOTH CONNECTION METHOD AND APPARATUS

CROSS REFERENCE TO RELATED APPLICATIONS

This application is the National Phase of PCT International Application No. PCT/KR2015/004676, filed on May 11, 2015, which claims priority under 35 U.S.C. 119(e) to U.S. Provisional Application No. 62/004,908, filed on May 30, 2014, all of which are hereby expressly incorporated by reference into the present application.

TECHNICAL FIELD

The present invention relates to a method and an apparatus for establishing connection between devices in a wireless communication system and more specifically, a method and an apparatus for reducing reconnection time in a Bluetooth pairing method.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

Some Bluetooth devices do not have a display or a user interface. It is also a fact that complexity for connection/management/control/disconnection is being increased among various types of Bluetooth devices, particularly among those Bluetooth devices based on similar technologies.

On the other hand, Bluetooth can provide relatively fast communication speed by using relatively low power and low cost; however, since the maximum transmission range of Bluetooth is limited to 100 m, it is suited for applications in a limited-scale environment.

DISCLOSURE

Technical Problem

An object of the present invention is to provide a Bluetooth pairing method.

Also, an object of the present invention is to provide a Bluetooth pairing method for initially paired devices.

Also, an object of the present invention is to provide a method for quickly performing an initial pairing procedure of Bluetooth pairing between initially paired devices.

Also, an object of the present invention is to provide a method for adding a semi-connected state to quickly perform the initial pairing procedure of Bluetooth pairing between initially paired devices.

Also, an object of the present invention is to provide a method for transmitting data in the semi-connected state.

Also, an object of the present invention is to provide a method for classifying a human input device into a button type device or a pointing type device and configuring the semi-connected state variably according to classification of each device.

Also, an object of the present invention is to provide a method for resolving collision occurred when a plurality of human input devices perform reconnection.

Also, an object of the present invention is to provide a method for configuring a scan point to resolve collision occurred when a plurality of human input devices perform reconnection.

Also, an object of the present invention is to provide a codeword detection method to resolve intra-interference occurred when a plurality of human input devices perform reconnection.

Also, an object of the present invention is to provide a method for using energy detection to resolve inter-interference occurred by network communication other than Bluetooth when reconnecting.

Also, an object of the present invention is to provide a method for using energy detection and codeword detection together to resolve intra-interference and inter-interference.

Also, an object of the present invention is to provide a method for applying energy detection and codeword detection separately for the respective scan points.

Also, an object of the present invention is to provide a method for adjusting a scan period and a normal operation period of a master device adaptively by applying a Fibonacci sequence.

Technical Solution

To achieve the objectives above, the present invention provide a method and an apparatus for Bluetooth reconnection. More specifically, a method for preventing collision during Bluetooth reconnection procedure according to one embodiment of the present invention comprises measuring energy level of a received signal transmitted through a first channel; changing the first channel to the second channel when the energy level is larger than a predetermined threshold value; transmitting a trigger packet to a second device through the second channel; receiving a beacon packet through the second channel by the second device; and establishing a connection with the second device, wherein the first device stores information related to Bluetooth connection with the second device.

Also, the step of measuring energy level, comparing the energy level with a predetermined threshold value; and changing to the second channel according to the present invention are performed in a listening period for Bluetooth reconnection.

Also, each of the first channel and the second channel according to the present invention corresponds to one of three channels allocated for the Bluetooth reconnection procedure.

Also, the trigger packet according to the present invention includes a sync word consecutively.

Also, information related to Bluetooth connection with the second device according to the present invention includes at least one of a unique address (BD_ADDR) of a Bluetooth module allocated to the first device or a logical transport address (LT_ADDR) allocated to the first device.

Also, the step of establishing a connection according to the present invention further comprises transmitting a request message requesting a connection to the second device by using Bluetooth communication from the second device through a specific channel; receiving a confirm message in response to the request message from the second device through the specific channel; and switching to a semi-connected state for transmission of short data.

Also, the request message according to the present invention includes device type information of the first device, and the device type corresponds to a button type or a pointing type.

Also, the confirm message according to the present invention includes at least one of the minimum data transmission number and the data transmission number.

Also, the data transmission number according to the present invention is set to the half of the minimum data transmission number when the first device is of button type and set to the same value as the minimum data transmission number when the first device is of pointing type.

Also, the first device according to the present invention increases the data transmission number by one when the first device transmits data to the second device, and decreases the data transmission number by one when the first device does not transmit data to the second device.

Also, the first device according to the present invention switches to connected state when the data transmission number is larger than the minimum data transmission number.

Also, an apparatus according to the present invention comprises a communication unit for transmitting and receiving a signal to and from the outside; and a controller functionally connected to the communication unit, wherein the controller is configured to measure energy level of a received signal transmitted through a first channel, compare the energy level with a predetermined threshold value; change the first channel to a second channel, when the energy level is larger than the predetermined threshold value, transmit a trigger packet to a second device through the second channel, receive a beacon packet from the second device through the second channel, and establish a connection to the second device, wherein the first device stores information related to Bluetooth connection with the second device.

Advantageous Effects

According to a method for Bluetooth connection in one embodiment of the present invention, Bluetooth reconnection time can be reduced.

According to a method for Bluetooth connection in one embodiment of the present invention, Bluetooth reconnection time can be reduced by storing existing connection information at the time of Bluetooth reconnection.

According to a method for Bluetooth connection in one embodiment of the present invention, short data can be transmitted before a device enters a connected state by configuring a semi-connected state at the time of Bluetooth reconnection.

According to a method for Bluetooth connection in one embodiment of the present invention, a Bluetooth reconnection procedure can be performed efficiently by varying a reconnection procedure according to device type.

According to a method for Bluetooth reconnection in one embodiment of the present invention, in case devices collide with each other while Bluetooth reconnection procedure is performed, collision can be resolved.

According to a method for Bluetooth connection in one embodiment of the present invention, in case devices collide with each other while Bluetooth reconnection procedure is performed, collision can be resolved by setting up a listening period.

According to a method for Bluetooth connection in one embodiment of the present invention, in case devices collide with each other while Bluetooth reconnection procedure is performed, collision can be resolved by Waiting on a specific channel.

According to a method for Bluetooth connection in one embodiment of the present invention, in case devices collide with each other while Bluetooth reconnection procedure is performed, collision can be resolved by changing a channel for reconnection procedure.

According to a method for Bluetooth connection in one embodiment of the present invention, in case devices collide with each other while Bluetooth reconnection procedure is performed, collision can be resolved through energy detection.

According to a method for Bluetooth connection in one embodiment of the present invention, in case devices collide with each other while Bluetooth reconnection procedure is performed, collision can be resolved through codeword detection.

BRIEF DESCRIPTION OF THE DRAWINGS

FIG. 1 illustrates one example of a Bluetooth network.

FIG. 2 is a diagram showing an example of an internal block of a device to which an embodiment of the present invention may be applied.

FIG. 3 illustrates a protocol stack provided for Bluetooth communication, to which the present invention is applied.

FIG. 4 illustrates a Bluetooth connection procedure.

FIG. 5 illustrates a Bluetooth process to which the present invention is applied.

FIG. 6 illustrates one example of a Bluetooth trigger channel and time frame to which the present invention is applied.

FIGS. 7 and 8 illustrate one example of a trigger scan procedure of a Bluetooth host device to which the present invention is applied.

FIG. 9 illustrates a time frame relationship between a Bluetooth host device and a human input device, to which the present invention is applied.

FIG. 10 illustrates one example of a Bluetooth reconnection procedure to which the present invention is applied.

FIG. 11 is a flow diagram illustrating one example of state transition of a human input device during a Bluetooth reconnection procedure, to which the present invention is applied.

FIG. 12 is a flow diagram illustrating one example of setting state transition value differently according to a human input device, to which the present invention is applied.

FIG. 13 is a flow diagram illustrating one example of changing the state of a human input device from semi-connected state to connected state, to which the present invention is applied.

FIG. 14 is a flow diagram illustrating one example of changing the state of a human input device from semi-connected state to suspended state, to which the present invention is applied.

FIG. 15 is a flow diagram illustrating another example of changing the state of a human input device from semi-connected state to connected state, to which the present invention is applied.

FIGS. 16 to 17b illustrate collision that can occur when a plurality of human input devices attempt Bluetooth reconnection, to which the present invention is applied.

FIG. 18 illustrates one example of a time frame to resolve collision among a plurality of human input devices, to which the present invention is applied.

FIG. 19 is a flow diagram illustrating one example of resolving collision among a plurality of human input devices, to which the present invention is applied.

FIG. 20 is a flow diagram illustrating another example of resolving collision among a plurality of human input devices, to which the present invention is applied.

FIG. 21 is a flow diagram illustrating one example of a time frame to resolve collision while Bluetooth reconnection procedure is performed, to which the present invention is applied.

FIG. 22 illustrates one example of resolving inter-interference.

FIG. 23 illustrates one example of resolving inter-interference.

FIG. 24 is a flow diagram illustrating one example of resolving interference.

FIG. 25 is a flow diagram illustrating another example of a time frame to resolve interference.

FIG. 26 illustrates one example of changing lengths of a scan interval for performing Bluetooth connection and a normal operation period, to which the present invention is applied.

MODE FOR INVENTION

The aforementioned objects, features, and advantages of the present invention will become more apparent through the following detailed description with respect to the accompanying drawings. However, since the present invention can be modified in various ways and can have various embodiments, the present invention will be described with reference to accompanying drawings illustrating specific embodiments. Throughout this document, unless otherwise specified, the same reference numbers refer to the same elements. In describing the present invention, in case a detailed description of known techniques or structures associated with the present invention unnecessarily obscures the gist of the present invention, the detailed description thereof will be omitted.

Hereinafter, a method and an apparatus related to the present invention will be described in detail with reference to the accompanying drawings. In the following description, suffixes such as 'module' and 'unit' for referring to the elements used in the following description are assigned or used interchangeably by taking into account only the convenience of writing the specification of the present invention and do not have individual implications or provide individual roles that can be distinguished from each other.

Electronic devices in this document may include a cellular phone, smartphone, laptop computer, digital broadcasting terminal, personal digital assistants (PDA), portable multimedia player (PMP), and navigation terminal; however, it should be clearly understood by those skilled in the art that except for those specific cases applicable only to a mobile terminal, the structure according to the embodiments of the present invention can also be applied to fixed terminals such as a digital TV and a desktop computer.

A signal described in this document can be transmitted in the form of not only a message but also a frame.

FIG. 1 illustrates one example of a Bluetooth network.

With reference to FIG. 1, Bluetooth can provide a service through pairing with various electronic devices 100.

Bluetooth is a radio frequency (RF) specification proposed for exchanging point-to-multi-point voice and data over short distances.

Bluetooth signals can be transmitted by penetrating both metallic and non-metallic materials. The transmission distance of Bluetooth ranges from 10 cm to 10 m but can be extended up to 100 m if transmission power is increased. The aforementioned features are based on the use of a low cost, short range wireless link, by which ad-hoc connection can be established easily in a fixed and mobile communication environment.

Bluetooth operates at 2.45 GHz frequency in the ISM band which is the same frequency band for the 802.11b/g wireless LAN specification, and Bluetooth devices can perform wireless communication with neighboring Bluetooth devices through a search/selection/authentication (pairing) process.

Although Bluetooth can provide a relatively high data rate with relatively low power and low cost, transmission range is limited up to 100 m, which makes Bluetooth appropriate for use in a limited space.

Bluetooth ver2.0 was released with the introduction of EDR (Enhanced Data Rate) specification; Bluetooth became popular rapidly ever since a predetermined level of communication quality has been ensured. Along with a wide use of Bluetooth, use of Bluetooth-enabled mobile phones is also being widely used. In particular, short range data communication based on Bluetooth is being widely used, one example of which is wireless music listening through Bluetooth communication to and from a Bluetooth headset.

Also, examples of Bluetooth applications include music play through Bluetooth pairing between a smartphone and car speakers or music play through pairing of a Bluetooth docking speaker and a smartphone, which demonstrates the increasing use of Bluetooth.

Meanwhile, since WPAN (Wireless Personal Area Network) can be used to transmit a small amount of data among devices in such environments as home network, small office, and vehicular network, energy efficiency can be maximized.

Also, WPAN is in a wide use since it can be used to maximize energy efficiency even when a real-time A/V steaming service is provided through an electronic device such as a headset with a limited bandwidth, and a remote control function is performed according to the service.

Recently, the number of human input device products such as mice and keyboards adopting Bluetooth BR/EDR is growing rapidly. Human input devices 200 can be divided largely into mice 200-2 and keyboards 200-1.

Since the mouse 200-2 and keyboard 200-1 do not have a separate ON/OFF button, a human input device 200 not used continuously for hours switches its Bluetooth module to a sleep state to prevent energy loss; in case a user attempts to use the corresponding device again, Bluetooth pairing with a host device 100 such as PC or notebook has to be performed again. Also, frequent pairing of the human input device 200 causes frequent delays and considerably impairs user convenience.

Therefore, the present invention proposes a method and an apparatus for reducing delay when a Bluetooth human input device attempts to reconnect to a host device.

FIG. 2 is a diagram showing an example of an internal block of a device to which an embodiment of the present invention may be applied.

The host device 100 and the human input device 200 can represent all kinds of electronic devices capable of supporting Bluetooth function.

The human input device 200 can receive data from direct communication with a different device and inform the different device of the processed result of the received data.

Also, the human input device 200 can get a request form the different device for data, transmit the requested data again, send a notification or indication message to the different device to transmit the requested data, and receive a confirm message with respect to the notification or indication message sent.

The host device 100 refers to any kind of device which can establish a Bluetooth connection and transmit/receive data upon receiving a connection request from the human input device 200 or from a different device.

The host device 100 and the human input device 200 can comprise a communication unit 110, 210, user input unit 120, 220, output unit 130, 230, controller 140, 240, memory 150, 250, and power supply 160, 260.

The communication unit 110 and 210, the user input unit 120 and 220, the output unit 130 and 230, the controller 140 and 240, the memory 150 and 250, and the power supply unit 160 and 260 are functionally connected in order to perform the method suggested in the present invention.

The components illustrated in FIG. 2 are not essential, and thus it may be possible to have more or less components.

The communication unit 110 and 210 may include one or more modules which allow wireless communication between the device and the wireless communication system or between the device and the network where the device is located. For example, the communication unit 110 and 210 may include a broadcast receiving module (not shown), a mobile communication module (not shown), a wireless Internet module (not shown), and a short distance communication module (not shown).

The communication unit 110 and 210 may also be called a transmission/reception unit.

The mobile communication module exchanges radio signals with at least one of a base station, an external terminal or a server over a mobile communication network. The radio signal may include a variety of types of data according to the transmission and reception of voice call signals, video telephony call signals, or text/multimedia messages.

The wireless Internet module refers to a module for wireless Internet access. The wireless Internet module may be internal or external to a device. A Wireless LAN (WLAN) (Wi-Fi), a Wireless Broadband (WiBro), a World Interoperability for Microwave Access (WiMax), and High Speed Downlink Packet Access (HSPDA) may be used as the wireless Internet technology.

The device can form a Wi-Fi P2P (Peer-to-Peer) connection to a different device through the wireless Internet module. Through the Wi-Fi P2P connection, a streaming service can be provided among devices, data transmission/reception can be provided, or a printing service can be provided through a printer.

The user input unit 110, 220 generates input data for the user to perform motion control and can comprise a key pad, dome switch, touch pad (pressure/capacitive), jog wheel, or jog switch.

In the present invention, the human input device 200 can be classified as a button-type device for receiving a user input or a device receiving a user input through a pointing method.

The output unit 130 and 230 generates output related to visual, auditory, or tactile senses and may include a display module 132 and 232 and a sound output module 134 and 234.

The display module 132 and 232 displays information processed by the device. For example, if the device is call mode, the display module displays a User Interface (UI) or Graphic User Interface (GUI) related to a call. If the device is video telephony mode or photographing mode, the display module displays a photographed or/and received image, a UI, or a GUI.

The display module 132 and 232 may include at least one of a liquid crystal display, a thin film transistor liquid crystal display, an organic light-emitting diode, a flexible display, and a 3D display.

The sound output module 134 and 234 may output audio data received from the communication unit 130 and 230 or stored in the memory 150 and 250 in incoming call mode, communication mode, recording mode, voice recognition mode, and broadcast reception mode. The sound output module 134 and 234 outputs sound signals related to a function (e.g., a received call sound and a received message sound) performed in the device. The sound output module 134 and 234 may include a receiver, a speaker, and a buzzer.

The controller 140, 240 refers to a module controlling the overall operation of the host device 100 or the human input device 200 and can be configured to request transmission of a message through Bluetooth interface and other communication interfaces and to process a received message.

The control unit 140 and 240 may be called a controller, a microcontroller, or a microprocessor and may be implemented by hardware, firmware, software or a combination of them.

The control unit 140 and 240 may include Application-Specific Integrated Circuits (ASICs), other chipsets, logic circuits and/or data processing devices.

The memory 150 and 250 is a medium for storing a variety of types of information of the device. The memory 150 and 250 is connected to the control unit 140 and 240 and may store programs, applications, common files, and input/output data for the operations of the control unit 140 and 240.

The memory 150 and 250 may include at least of a flash memory type, a hard disk type, a multimedia card micro type, card type memory (e.g., SD or XD memory), Random Access Memory (RAM), Static Random Access Memory (SRAM), Read-Only memory (ROM), Electrically Erasable Programmable Read-Only Memory (EEPROM), Programmable Read-Only Memory (PROM), magnetic memory, a magnetic disk and an optical disk. The device may operate in conjunction with a web storage which performs a storage function of the memory 150, 250 on the Internet.

The power supply 160 and 260 refers to a module for being supplied with external power or internal power and supplying power for the operations of the elements under the control of the control unit 140 and 240.

FIG. 3 illustrates a protocol stack provided for Bluetooth communication, to which the present invention is applied.

With reference to FIG. 3, (a) illustrates a structure of BR/EDR protocol stack according to the Bluetooth BR/EDR specification, and (b) illustrates a structure of LE protocol stack according to the Bluetooth LE specification.

More specifically, Bluetooth protocol stack can comprise a upper host protocol 320, 420 and a lower controller protocol 310, 410 with respect to a host controller interface (HCI) 318, 416.

The controller 310, 410 corresponds to a Bluetooth module, and the host 320, 420, being connected to the Bluetooth module, controls the Bluetooth module and performs operation. A PC, PDA, or smartphone can be the host, and depending on situations, a processor included in a system can be the host.

In the present invention, a Bluetooth module can include a Bluetooth LE module and Bluetooth BR/EDR module.

(a) The BR/EDR protocol stack can comprise a BR/EDR profile 324, generic access profile (GAP) 323, BR/EDR protocol 322, logical link control and adaptation protocol (L2CAP) 321, link manager 316 included in the controller 310, link controller 314, and physical layer 312.

(b) The LE protocol stack can comprise an LE profile 426, generic access profile (GAP) 425, generic attribute profile (GATT) 424, attribute protocol (ATT) 423, security manager (SM) 422, logical link control and adaptation protocol (L2CAP) 421, link layer (LL) 414 included in the controller 410, and physical layer 412; but shows a difference from the aforementioned (a) BR/EDR protocol stack.

The controller 310, 410 and the host 320, 420 are connected to each other through a host controller interface (HCI) 318, 416.

The host 320, 420 can provide a command and data to the controller 310, 410 through the HCI 318, 416; and the controller 310, 410 can provide an event and data to the host 320, 420 through the HCI 318, 348.

(b) The PHY layer 412 of the LE protocol stack transmits and receives a radio signal and can comprise GFSK (Gaussian Frequency Shift Keying) modulation and 40 RF channels.

The link layer 414 can generate a device-to-device connection by performing an advertising and scanning function through three advertising channels and provide a function of exchanging data packets through 37 data channels.

The host 420 can perform multiplexing of various protocols and profiles provided by upper Bluetooth layer by using the L2CAP 421.

The L2CAP 421 can provide one bilateral channel for transmitting data to a particular protocol or profile and uses three fixed channels in the case of Bluetooth Low Energy (LE).

The fixed channels can be used as a signaling channel, security manager 422, and attribute protocol (in what follows, it is called ATT) 423, respectively.

Bluetooth BR/EDR (Basic Rate/Enhanced Data Rate) uses a dynamic channel and can support protocol service multiplexer, retransmission, and streaming mode.

The security manager (in what follows, it is called SM) 422 is a protocol used for device authentication and for providing key distribution.

The ATT 423 is used at the time of communication between a server and a client and has an attribute handle used by the client to access attributes in the server. Protocol operation commands include 'Request', 'Response', 'Command', 'Notification', 'Indication', and 'Confirmation'.

Request and response message: Request message is used for a client device to request specific information from a service device, and response message is a response to the request message, which refers to the message transmitted from the server device to the client device.

Command message: Message transmitted from a client message to a server message to command a specific operation, which the server device does not transmit a response to the command message to the client device.

Notification message: Message transmitted from a server device to a client device to notify of an event and the like, which the client device does not transmit a confirm message with respect to the notification message to the server device.

Indication and confirm message: Message transmitted from a server device to a client device to notify of an event and the like. Different from the case of notification message, the client device transmits a confirm message with respect to the indication message to the server device.

The generic attribute profile (in what follows, it is referred to as GATT, 424) is the layer newly defined for the Bluetooth LE technology and defines a procedure to obtain the corresponding information by using S/W elements of a Bluetooth device and the message defined in the ATT protocol described below. This procedure can define configuration of discovering, reading, writing, notifying, and indicating characteristics.

Service: a combination of behaviors related to data. It defines basic operation of a device.

Include: defines a relationship between services.

Characteristics: data value used by a service.

Behavior: a computer readable format defined in the form of UUID (Universally Unique Identifier)

The generic access profile (in what follows, it is referred to as GAP, 425) defines a method for discovering and connecting to a defined device and providing information to a user; and can provide privacy.

The LE profile 426 are profiles dependent on the GATT 424 and are usually applied to low energy devices.

The present invention proposes a method and an apparatus for establishing an efficient Wi-Fi P2P connection by transmitting information for a new network, for example, information for Wi-Fi P2P pairing by using the (a) BR/EDR protocol stack or the (b) LE protocol stack of Bluetooth which requires low power consumption and supports a relatively fast pairing procedure.

FIG. 4 illustrates a Bluetooth connection procedure.

A Bluetooth pairing procedure comprises a standby state and a connected state; a device which has completed the pairing procedure enters the connected state while a device which has terminated a connection operates in the standby state.

When Bluetooth devices perform a reconnection process S420 to reconnect to specific devices after being connected to the specific devices through a connection process S410, the Bluetooth devices attempt connection to the specific devices by going through the same procedure of the previous connection process S410.

More specifically, a human input device 200 enters a standby state by default when power is applied and can enter inquiry state to discover a nearby device to which the human input device can be connected; the host 100 can enter inquiry scan state to receive an ID packet transmitted by a neighboring device in the inquiry state.

The human input device 200 in the inquiry state transmits an inquiry message by using an ID packet for once or at predetermined time intervals to discover a connectable device in the surroundings thereof S412.

The ID packet can be GIAC (General Inquiry Access Code) or DIAC (Dedicated Inquiry Access Code).

After receiving GIAC or DIAC which is the ID packet transmitted by the host device 100, the human input device 200 can transmit a frequency hopping sequence (FHS) to the host device 100 to perform Bluetooth pairing with the host device 100 and can transmit an extended inquiry response (in what follows, it is referred to as EIR) depending on the needs, for example, in the presence of data to be transmitted.

If a connectable Bluetooth device is found in the neighborhood through the inquiry procedure, a paging procedure can be performed. The paging procedure refers to the step in which actual connection is performed if a connectable Bluetooth device is found in the neighborhood through the inquiry procedure by synchronizing a hopping sequence with address and clock information.

The host device 100 and the human input device 200 which have performed the connection go through the security establishment step S414 and L2CAP connection and service discovery step S416.

The L2CAP (Logical Link Control and Adaption Protocol) is a packet-based protocol and exhibits characteristics similar to the UDP protocol. The basic packet size of the L2CAP amounts up to 672 bytes, but once communication is started, it can be changed to have up to 65,535 bytes.

The human input device 200 which has gone through the L2CAP connection and service discovery step S416 can transmit data to the host device 100, S418.

The human input device 200 and the host device 100 which have gone through the connection process described above S410 switch their Bluetooth module to the sleep state to prevent energy consumption when no data is exchanged between each other for a predetermined time period, after which the connected state is terminated.

Afterwards, the human input device 200 and the host device 100 have to perform the reconnection process S420 to transmit/receive data again, and the reconnection process S420 can be performed through the same procedure of the connection process S410.

However, if the reconnection process is performed frequently, delay can be generated, and what is more, performing the same process applied for the initial connection again and again to re-establish a connection to the same device is apparently inefficient, not to mention the degradation of user convenience. Therefore, in what follows, a method for resolving such problem will be described.

FIG. 5 illustrates a Bluetooth process to which the present invention is applied.

With reference to FIG. 5, (a) the process of the current Bluetooth BR/EDR does not provide a procedure according to reconnection, and all of the devices are either in the connected state 514 through paging or in the standby state 512 due to termination of connection.

In case state of a device is described as being in the connected state 514 or standby state 512, a device not used for a predetermined time period may consume considerable time for connection from entering the standby state 512 then to entering the connected state 514 by going through a new paging step when the device is used again.

(b) In the Bluetooth process according to the present invention, only the device performing the initial Bluetooth connection stays in the standby state 522, but any device which has performed connection once before can enter the suspended state 524 rather than the standby state 522.

Different from the standby state 522, a device in the suspended state 524 can store unique address of a host device to which the device has been allocated (in what follows, the address is called BD_ADDR) and a connection history including LT_ADDR (Logical Transport Address); in case reconnection is performed, the device can enter a semi-connected state 526 for fast pairing while the device can enter the connected state 528 only when a continuous use of the device is required.

The semi-connected state 526 can represent an intermediate state between the standby state 522 and the connected state 528 and represent a temporary state for quickly delivering short event data.

In what follows, the procedure in which a device switches from the suspended state 524 to the semi-connected state 526 or from the standby state 522 to the semi-connected state 526 is referred to as FPPS (Fast Pre-Paging Scheme).

Through the FPPS, a Bluetooth device can carry basic information required for connecting again to the device to which it has been once connected and can be reconnected to the same device quickly by using the basic information.

FIG. 6 illustrates one example of a Bluetooth trigger channel and time frame to which the present invention is applied.

First, in case the human input device 200 has been connected to the host device 100 before, the human input device 200 can enter the semi-connected state 526 through the FPPS procedure.

More specifically, the human input device 200 once connected to the host device 100 is not used for a predetermined time period, the human input device 200 can switch to the suspended state 524 of FIG. 5, store only the connection information, and stop communication to reduce power consumption.

Afterwards, if the human input device 200 is reactivated by receiving the user's input, the human input device 200 transmits a trigger packet through a specific RF (Radio Frequency) channel to inform the host device 100 of the reactivated state.

The specific RF channel refers to the channel which receives the least effect from communication of a different network such as Wi-Fi; in what follows, such specific channel is called a trigger channel and will be described with reference to an example based on three channels.

(a) The human input device 200 can repeatedly set up a time frame that can be used to inform the host device 100 of an activated state in the three trigger channels n, n+1, n+2 and perform a procedure for reconnecting to the host 100 in the time frame interval.

(b) In the time frame interval, intervals transmitting a trigger packet by which the human input device 200 informs the host 100 of the activated state of the human input device 200 and beacon scan intervals for receiving a beacon transmitted by the host device 100 which has received the trigger packet can be located repeatedly.

The trigger packet can comprise consecutive sync words, and the host device 100 can know the activated state of the human input device 200 by detecting the sync word of a received trigger packet.

The sync word represents a signal of a specific pattern and may not include data. This is so because the host device 100 is unable to know from which part of the trigger packet it receives the packet.

In case the host device 100 receives the sync word, the host device 100 can transmit a beacon packet in response to the reception, and the human input device 200 which receives the beacon packet can stop operation of the suspended state 524 and switch to the semi-connected state 526 of FIG. 5.

FIGS. 7 and 8 illustrate one example of a trigger scan procedure of a Bluetooth host device to which the present invention is applied.

The host device 100 can perform periodic scanning to discover a human input device 200 which has been connected to the host device before.

More specifically, the host device 100 can configure scan periods 710, 730, 750 periodically to receive a trigger packet transmitted by the human input device 200 which has been once connected to the host device 100.

The scan operation performed in the scan periods 710, 730, 750 can be performed on the three trigger channels shown in FIG. 6, and the time period for the scan operation in each trigger channel can comprise a paging scan period for receiving the trigger packet and a sleep period.

The paging scan period can be set up for each trigger channel.

The sleep period can be set up to reduce power consumption of the host device 100 or can be set up to secure a time period in the next trigger channel for completing frequency configuration.

In other words, the host device 100 can discover the human input device 200 to which to attempt reconnection in the three trigger channels through the scan periods 710, 730, 750.

Since the time interval between the scan periods 710, 730, 750 can be closely related to the discovery time of the human input device 200, the scan periods 710, 730, 750 can be set up by taking into account the characteristics of a target system.

In case a sync word comprising the trigger packet is received through the periodic scan periods 710, 730, 750, the host device 100 can transmit a beacon packet to receive a connection of the human input device 200.

Since frequency hopping defined in the Bluetooth is performed in the normal operation period 720, 740, no signal can be received in the three trigger channels allocated for reconnection.

The human input device 200 which has received the beacon can switch to the semi-connected state 526 or connected state 528; in case the human input device 200 enters the connected state 528, the human input device 200 can perform direct communication by using frequency hopping according to the Bluetooth BR/EDR scheme through the normal operation period 720, 740.

FIG. 8 shows a trigger scan procedure of the host device 100, different from the trigger scan procedure of FIG. 7.

With reference to FIG. 8, different from the embodiment of FIG. 7, the host device 100 can scan the three trigger channels for receiving a trigger packet transmitted from the human input device 200 continuously without a sleep period.

In this way, the scan periods 810, 830, 850 of the trigger channel can be reduced through continuous scan.

The periodic scan periods 710, 730, 750 of FIG. 7 can be overheads on the Bluetooth BR/EDR operation as long as a reconnection request of the human input device 200 does not occur and can deteriorate the overall performance of the Bluetooth BR/EDR in case interval between periodic scan periods is set to be short. Therefore, the embodiment of reducing the scan periods 810, 830, 850 of FIG. 8 can reduce the overhead on the Bluetooth BR/EDR, thereby improving the performance thereof.

FIG. 9 illustrates a time frame relationship between a Bluetooth host device and a human input device, to which the present invention is applied.

FIG. 9 illustrates a process performed by the human input device 200 described with reference to FIGS. 7 and 8 in conjunction with the host device 100.

More specifically, in case an input is received from the user while the human input device 200 which has not been connected before to the host device 100 is staying in the suspended state 524 due to not being used for a predetermined time period, the human input device 200 transmits a trigger packet continuously from a trigger channel n to enter the semi-connected state 526, S910.

However, since the host device 100 is currently staying in the normal operation period, the host device 100 is unable to enter the periodic scan period and thus unable to receive a trigger packet in the corresponding channel n and also unable to transmit a beacon packet.

Since the host device 100 does not transmit a beacon packet, the human input device 200 is unable to receive a beacon packet, which is a response of the host device, in the beacon scan period S912.

Since the human input device 200 has failed to receive the beacon packet, the human input device 200 can change channels among the predetermined three trigger channels and transmit a trigger packet again from the channel n+1 to the host device S914.

After entering the periodic scan period, the host device 100 can change the channel as the trigger packet has not been received from the channel n and receive a trigger packet from the human input device 200 from the channel n+1.

The host device 100 which has received the trigger packet can transmit a beacon packet to the human input device 200, and the human input device 200 can receive the beacon packet transmitted by the host device 100 in the beacon scan period S916.

Afterwards, the human input device 200 can transmit a connection request message for requesting reconnection to the host device 100 through the channel n+1 S918.

The host device 100 which has received the connection request message can transmit a connection confirm message to the human input device 200 in case reconnection of the human input device 200 is approved S920, and the human input device 200 which has received the connection confirm message can switch to the semi-connected state 526.

In the semi-connected state 526, simple data can be exchanged, and through the data exchange, the human input device 200 can transmit the input data received from the user to the host device 100, S922, and the host device 100 can transmit a poll message to the human input device 200.

Afterwards, in case there exist data to be transmitted to the host device 100, the human input device 200 can transmit the data to the host device 100 in response to the poll message.

FIG. 10 illustrates one example of a Bluetooth reconnection procedure to which the present invention is applied.

With reference to FIG. 10, in the presence of a user input, the human input device 100 which has already been connected to the host device 100 can reconnect to the host device 100 to transmit the user input.

More specifically, the human input device 200 being connected to the host device 100 through Bluetooth switches to the suspended state if it is not used for a predetermined time period S1010.

The host device periodically turns to the trigger scan state S1010 to receive a trigger packet transmitted by a nearby human input device 200 for connection, and if receiving a trigger packet transmitted by a nearby human input device while being in the trigger scan state, the host device can perform a reconnection procedure.

In case the human input device 200 in the suspended state receives an input from the user, the human input device 200 can transmit a trigger packet to the host device from the channel n for reconnection to the host device. At this time, the host device 100 in the trigger scan state at the trigger channel n can receive the trigger packet S1030.

As shown in FIG. 6, the trigger packet consists of no other data other than sync words.

The host device 100 which has received the trigger packet can transmit a beacon packet for reconnection to the human input device 200 in response to the trigger packet. S1040.

Parameters that the beacon packet can include are shown in Table 1 below.

TABLE 1

| Frame | Parameter |
|---|---|
| Beacon | BD_ADDR |
|  | CLK |
|  | LT_ADDR |

The beacon packet can include clock (CLK) information to inform the human input device 200 of a hopping sequence of the host device 100 and can include LT_ADDR which is the logical transport address for fast connection and BD_ADDR which is the unique address of Bluetooth module.

The human input device 200 which has received the beacon can transmit a connection request message requesting the host device 100 for connection to switch to the semi-connected state S1050.

Table 2 shows parameters that can be included in the connection request message.

TABLE 2

| Frame | Parameter |
|---|---|
| Connection_Request | BD_ADDR |
|  | Resume |
|  | EDR_allowed |
|  | 3-slot_packets_allowed |
|  | 5-slot_packets_allowed |
|  | Role_switch_requested |
|  | Dev_type |

The EDR_allowed indicates whether a previous connection used Bluetooth BR method or Bluetooth EDR method and can be used to specify which method to use at the time of reconnection. For example, the EDR_allowed indicates that a previous connection has used the Bluetooth EDR method while BR_allowed indicates that Bluetooth BR has been used for the previous connection. The Resume indicates that the connection request is a reconnection request.

The 3-slot_packets_allowed and the 5-slot_packets_allowed describe how many data packets are transmitted before the human input device 200 in the semi-connected state to change its state to the connected mode.

The Role_switch_request can indicate that the human input device 200 requests operation as a slave device rather than a master device. In other words, in case the human input device 200 attempts the initial connection by using Bluetooth BR/EDR, the human input device 200 operates as a master device, after which the human input device 200 operates as a slave device through role switching.

However, since the aforementioned process is not necessary for the reconnection procedure, the Role_switch_request can be transmitted to omit the corresponding process.

The Dev_type can include information indicating which type of device the human input device 200 corresponds to, for example, keyboard, button input type device or a mouse, a pointing input type device.

The host device which has received the connection request message can transmit connection confirm message to the human input device 200, and Table 3 shows parameters that can be included in the connection confirm message.

TABLE 3

| Frame | Parameter |
|---|---|
| Connection_Confirm | BD_ADDR |
|  | Resume |
|  | EDR_allowed |
|  | Active_Mode_Instant |
|  | Mode_Counter |

The EDR_allowed can include information indicating whether the Bluetooth reconnection is allowed.

The Active_Mode_Instant represents the minimum number of data transmission for the human input device 200 to enter the connected state, and the Mode_Counter, being configured by the host device, can represent the state value changed according to whether the human input device 200 has transmitted data or not.

The Active_Mode_Instant value, after being configured by the host device 100 at the initial step, is not changed while the human input device 200 is in the same semi-connected state.

The human input device 200 which has received the connection confirm message can switch to the semi-connected state S1070 and transmit data received from the user to the host device 100, S1090.

Afterwards, the host device can transmit a poll message to the human input device 200, and if there exist data to be transmitted, the human input device 200 can transmit the data to the host device 100 in response to the poll message.

FIG. 11 is a flow diagram illustrating one example of state transition of a human input device during a Bluetooth reconnection procedure, to which the present invention is applied.

With reference to FIG. 11, in case a human input device once connected to a host device performs connection again to the host device, state of the human input device is changed according to whether a user input is received and whether data are transmitted continuously.

More specifically, the human input device 200 once connected to the host device can switch to suspended state if it is not used for a predetermined time period.

Afterwards, the human input device 200 can check existence of a user input continuously S1102 and in the presence of a user input, can perform a procedure for switching to the semi-connected state.

Since the steps of S1104 to S1110 are the same as the steps of S1030 to S1070 of FIG. 10, descriptions thereof will be omitted.

The human input device 200 can enter the semi-connected state as it receives a confirm message from the host device 100; at this time, the host device 100 can configure the Active_Mode_Instant and the Mode_Counter value of the human input device 100 of FIG. 10 through the confirm message.

The human input device 200 which has switched to the semi-connected state can receive a poll message from the host device S1112, and in the presence of data to be transmitted, the human input device 200 can transmit the data to the host device 100 in response to the poll message.

According to transmission of the data, the human input device 200 can change the Mode_Counter value. In other words, in case data are transmitted, the Mode_Counter value is increased by one S1118, but the Mode_Counter value is decreased by 1, otherwise S1116.

The human input device 200 which has changed the Mode_Counter value can compare the Mode_Counter value with the Active_Mode_Instant value S1120.

If it turns out from the comparison result that the Mode_Counter value is larger than the Active_Mode_Instant value, the human input device 200 can determine that continuous data have occurred and enter the connected state on the basis of clock (CLK) information of the host device included in the beacon packet S1122. Afterwards, the human input device 200 which has entered the connected state can transmit data according to the Bluetooth frequency hopping.

However, if the Mode_Counter value is less than the Active_Mode_Instant, the human input device 200 can compare the Mode_Counter value with 0, S1124.

If it turns out from the comparison result that the Mode_Counter value is less than 0, the human input device 200 can determine that it has not been used for a predetermined time period due to no data transmission and enter the suspended state S1126.

However, if the Mode_Counter value is larger than 0, the human input device 200 again receives a poll message from the host device and performs the steps of S1114 to S1124 repeatedly.

Since the semi-connected state is a transient and temporary state, if the semi-connected state lasts long, a delay due to data transmission according to frequency hopping can be generated, and data processing capability can be impaired.

Therefore, the time period for which the human input device 200 remain in the semi-connected state can be reduced by initiating data transmission/reception according to the frequency hopping procedure through normal operation of Bluetooth in case data occurrence rate of the human input device 200 which attempts reconnection is high but by using short data delivery in the semi-connected state in the opposite case.

FIG. 12 is a flow diagram illustrating one example of setting state transition value differently according to a human input device, to which the present invention is applied.

With reference to FIG. 12, reconnection procedure can be performed by setting up the Mode_Counter value differently according to the type of the human input device 200.

More specifically, the Mode_Counter value can be set differently by classifying the human input device 200 as either a pointing device (for example, mouse) or a button device (for example, keyboard).

In the case of button device, it is very often the case that input data are not continuous, size of information is small, and information occurs infrequently; therefore, the human input device 200 can be made to transmit/receive a small amount of data while being in the semi-connected state and to switch to the suspended state.

However, since the pointing device may generate continuous data repeatedly while being in use, and the amount of data may be large compared with that of the button device, the human input device 200 can be made to minimize data transmission/reception while being in the semi-connected state and to switch to the connected state.

Due to the characteristics of individual devices, the Mode_Counter value can be set differently for the respective device types.

In case the host device 100 receives a connection request message from the human input device 200 through the procedure of FIG. 9 or 10, the host device 100 can determine whether the human input device 200 is button type or pointing type through the device type included in the connection request message S1210.

Table 4 below shows one example of device type information (Dev_Type) included in the connection request message.

TABLE 4

| Dev_Type (1 bit) | Definition |
| --- | --- |
| 0 | Button type |
| 1 | Pointing type |

With reference to Table 4, in case the Dev_Type value is 1, the host device 100 can know that the human input device 200 is a pointing type device (for example, mouse) and set the Mode_Counter value to the same value as the Active_Mode_Instant.

However, in case the Dev_Type is 0, the host device 100 can know that the human input device 100 is a button type device (for example, keyboard) and set the Mode_Counter value as half the value of the Active_Mode_instant.

The host device 100 can transmit the Mode_Counter and the Active_Mode_Instant value set as above to the human input device 200 by including it in a confirm message, and the human input device 200 can set the Mode_Counter and the Active_Mode_Instant value through the confirm message.

FIG. 13 is a flow diagram illustrating one example of changing the state of a human input device from semi-connected state to connected state, to which the present invention is applied.

With reference to FIG. 13, as the human input device 200 of button type transmits data continuously, it can switch from the semi-connected state to the connected state.

Since the steps of S1310 to S1322 are the same as the steps of S1030 to S1090 of FIG. 10, descriptions thereof will be omitted.

More specifically, in case the human input device 200 in the semi-connected state is of button type, the Mode_Counter value can be set to half the value of the Active_Mode_Instant according to the procedure of FIG. 12.

For example, in case the Active_Mode_Instant is 6, the Mode_Counter can be set to 3. Afterwards, in the presence of data to be transmitted to the host device 100, the human input device 200 can transmit the data to the host device 100 in response to a poll message S1324 and increase the Mode_Counter value by 1 to change it to 4.

The human input device 200, the Mode_Counter value of which has been changed to 4, can receive a poll message again from the host device 100 S1326, and in the presence of data to be transmitted, can transmit data to the host device 100 continuously S1328.

The human input device 200 which has transmitted the data can increase the Mode_Counter value again by 1 to change it to 5 and change the Mode_Counter value to 6 again through reception of a poll message and data transmission S1332.

Afterwards, if receiving a poll message S1334, since the Mode_Counter value has become larger than the Active_Mode_Instant value, the human input device 200 does not remain in the semi-connected state but can enter the connected state to transmit data S1336.

Also, the host device 100 can change channel from the trigger channel to perform data transmission/reception through frequency hopping according to the Bluetooth BR/EDR S1338, and the human input device 200 which has entered to the connected state can perform data transmission/reception through the Bluetooth BR/EDR method by synchronizing the frequency hopping sequence of the host device 100 by using the clock (CLK) information included in a beacon packet by the host device 100.

FIG. 14 is a flow diagram illustrating one example of changing the state of a human input device from semi-connected state to suspended state, to which the present invention is applied.

With reference to FIG. 14, in case the human input device which has switched to the semi-connected state does not transmit data for more than a predetermined time period, the human input device can again enter the suspended state to reduce energy consumption.

Since the steps of S1410 to S1424 are the same as the steps of S1030 to S1090 of FIG. 10, descriptions thereof will be omitted.

More specifically, in case the human input device 200 in the semi-connected state is of button type, the Mode_Counter value can be set to half the value of the Active_Mode_Instant according to the procedure of FIG. 12.

For example, in case the Active_Mode_Instant is 6, the Mode_Counter can be set to 3.

In case the human input device 200 does not have data to transmit to the host device 100, the human input device 200 is unable to respond to a poll message of the host device 100 and can decrease the Mode_Counter value by 1 to change it to 2.

The host device 100 can transmit a poll message again to the human input device 200, S1426, and in case in the absence of data to be transmitted to the host device, the human input device 200 can decrease the Mode_Counter value by 1 again to change it to 1.

Afterwards, in case there still exist no data to be transmitted to the host device 100, the human input device 200 is unable to transmit data in response to the poll message of the host device but can continue to decrease the Mode_Counter value by 1, S1428, S1430.

In case the Mode_Counter value becomes less than 0 as there is no data to be transmitted to the host device 100, the human input device 200 can switch from the semi-connected state to the suspended state S1432, and the host device 100 can change channel from the trigger channel to perform Bluetooth operation through frequency hopping S1434.

FIG. 15 is a flow diagram illustrating another example of changing the state of a human input device from semi-connected state to connected state, to which the present invention is applied.

With reference to FIG. 15, in case the human input device 200 is of pointing device, it is often the case that the amount of input data is large, and data are generated continuously, the human input device 200 can be promptly switched from the semi-connected state to the connected state.

Since the steps of S1510 to S1520 are the same as the steps of S1030 to S1090 of FIG. 10, descriptions thereof will be omitted.

More specifically, in case the human input device 200 in the semi-connected state is of pointing type, the Mode_Counter value can be set to the same value of the Active_Mode_Instant according to the procedure of FIG. 12.

For example, in case the Active_Mode_Instant is 3, the Mode_Counter can be set to 3.

Afterwards, since the Mode_Counter value is larger than the Active_Mode_instant value, the human input device 200 is no longer in the semi-connected state but switches to the connected state to transmit data S1522.

Also, the host device 100 can change channel from the trigger channel to perform data transmission/reception through frequency hopping according to the Bluetooth BR/EDR S1524, and the human input device 200 which has entered the connected state can perform data transmission/reception through the Bluetooth BR/EDR method by synchronizing the frequency hopping sequence of the host device 100 by using the clock (CLK) information included in a beacon packet by the host device 100.

Through the process described above, since it is highly probable that an input is generated continuously from the user in case the human input device 200 is a pointing type device, efficiency of data transmission/reception can be improved by minimizing the time period in the semi-connected state.

FIGS. 16 to 17b illustrate collision that can occur when a plurality of human input devices attempt Bluetooth reconnection, to which the present invention is applied.

With reference to FIG. 16, in case the host device 100 disables Bluetooth function temporarily while transmitting/receiving data to and from human input devices 200-1, 200-2 through Bluetooth connection, Bluetooth connection to the human input devices 200-1, 200-2 is terminated.

Afterwards, in case the human input devices 200-1, 200-2 attempt reconnection, the human input devices 200-1, 200-2 may not be able to succeed to reconnect to the host device even if the Bluetooth function of the host device is enabled.

Examining collision that can occur when the human input devices 200-1, 200-2 attempt reconnection with reference to FIGS. 17a and 17b, in the case of FIG. 17a, if beacon scan periods of the human input device 1 (200-1) and the human input device 2 (200-2) do not overlap with each other, namely, if the human input device 2 (200-2) transmits a trigger packet while the human input device 1 (200-1) transmits a trigger packet, the host device 100 can receive a trigger packet continuously from the human input device 1 (200-1) and the human input device 2 (200-2) and thus collision while receiving the trigger packet can occur even if the host device 100 transmits a beacon packet.

Also, with reference to FIG. 17b, in case the beacon scan periods overlap with each other as the human input device 1 (200-1) and the human input device 2 (200-2) attempt reconnection to the host device 100 simultaneously, the host device 100 is unable to determine to which device to transmit a beacon packet since trigger packets of the human input device 1 (200-1) and the human input device 2 (200-2) are received being intermixed with each other.

In what follows, a method for resolving such collision will be described.

FIG. 18 illustrates one example of a time frame to resolve collision among a plurality of human input devices, to which the present invention is applied.

With reference to FIG. 18, to remedy a problem described with reference to FIGS. 16 to 18, the human input device 200 can determine whether another human input device transmits a trigger packet for reconnection by defining a listening period before transmitting a trigger packet for reconnection.

In what follows, operation in the listening period will be described in detail.

FIG. 19 is a flow diagram illustrating one example of resolving collision among a plurality of human input devices, to which the present invention is applied.

The human input device 200 once connected to the host device 100 can set up a listening period to prevent collision with a reconnection procedure performed by another human input device before transmitting a trigger packet for reconnecting to the host device 100.

With reference to FIG. 19, the human input device 200 can receive a trigger packet transmitted to the host device 100 by another human input device in the listening period S1910.

In case the human input device 200 does not receive a trigger packet of another human input device in the listening period, the human input device 200 transmits a trigger packet to the host device 100 to perform the reconnection procedure described in FIG. 9 or 10, S1920.

However, in case the human input device 200 receives a trigger packet of another human input device in the listening period, or in case the corresponding channel is not in the idle state (for example, in the case of collision with another network rather than Bluetooth), another human input device can perform a reconnection procedure or wait in the channel without transmitting a trigger packet to the host device 100 after determining that communication with a different network is being performed.

Afterwards, in case a trigger packet is no longer received in the channel or corresponding channel is in the idle state, the human input device 200 can perform the reconnection procedure described with reference to FIG. 9 or 10, S1920.

By using the listening period, the human input device 200 can reduce collision with another human input device in a reconnection process.

FIG. 20 is a flow diagram illustrating another example of resolving collision among a plurality of human input devices, to which the present invention is applied.

FIG. 20 illustrates operation of a human input device in a listening period to prevent collision with another human input device, different from that of FIG. 19; collision can be avoided by changing a trigger channel.

More specifically, the human input device 200 can receive a trigger packet transmitted by another human input device to the host device 100 in the listening period S2010.

In case the human input device 200 does not receive a trigger packet of another human input device in the listening period, the human input device 200 can perform the reconnection procedure described with reference to FIG. 9 or 10 by transmitting a trigger packet to the host device 100, S2020.

However, in case the human input device 200 receives a trigger packet of another human input device in the listening period or the corresponding channel is in the idle state (for example, in the case of collision with another network rather than Bluetooth), another human input device can perform a reconnection procedure or determine that communication with a different network is being performed.

In this case, the human input device 200 can determine whether a movable trigger channel exists among the three trigger channels described in FIG. 7 S2030. In other words, the human input device 200 can determine existence of a trigger channel which has not attempted a reconnection procedure. S2030.

In the presence of the movable trigger channel, the human input device 200 can perform the S2010 step again through the listening period after changing channel to the movable trigger channel without transmitting a trigger packet in a current trigger channel S2050.

However, in the absence of the movable trigger channel, the human input device 200 can avoid collision by performing the procedure described in FIG. 19, S2040.

Through the procedure described with reference to FIGS. 19 and 20, the human input device 200 can perform a reconnection procedure while avoiding collision, and the procedure of FIGS. 19 and 20 can be performed not only in the listening period but also in the beacon scan period.

FIG. 21 is a flow diagram illustrating one example of a time frame to resolve collision while Bluetooth reconnection procedure is performed, to which the present invention is applied.

FIGS. 16 to 20 illustrates a procedure performed for collision avoidance among human input devices for Bluetooth reconnection. However, failure of the human input device 200 to receive a beacon packet due to interference may be caused not only by other human input devices but also by a different network using the same frequency band (for example, Wi-Fi).

Therefore, to remove the interference, a scan point 2110 through which interference can be found is defined, and the interference problem can be resolved through an interference removal procedure.

More specifically, the interference can be classified into two types. In what follows, the interference caused by a different network sharing the same frequency band, such as Wi-Fi, is called inter-interference while the interference caused from a reconnection procedure according to the FPPS procedure described in FIGS. 16, 17a, and 17b is called intra-interference.

The human input device 200 can resolve the inter-interference or intra-interference by setting up a scan point 2110 in a listening period or beacon scan period.

In what follows, a specific method for resolving interference will be described.

FIG. 22 illustrates one example of resolving inter-interference.

With reference to FIG. 22, the human input device 200 can determine whether the inter-interference is caused from a different network such as Wi-Fi sharing the same frequency band through energy detection and perform a procedure to resolve the inter-interference.

More specifically, the human input device 200 can set up a scan point in the listening period or the scan period as shown in FIG. 22.

At the scan point, the human input device 200 can measure energy level of a signal received by the communication unit of the human input device 200 by performing energy detection S2210.

The human input device 200 employs the energy detection to measure signal power of a signal received through a specific channel (where energy can indicate power of a received signal) and can perform energy detection to determine whether a received signal causes interference on Bluetooth communication between the human input device 200 and the host device 100.

The human input device 200 can compare the measured energy level with a threshold value predetermined in the human input device 200, S2220.

In case the energy level is lower than the threshold value, the human input device 200 can determine that inter-interference is not generated and perform the reconnection procedure described in FIG. 9 or 10 by transmitting a trigger packet S2230.

However, if the energy level is higher than the threshold value, the human input device 200 can determine that inter-interference has been caused from a different network sharing the same frequency band and avoid the inter-interference by either waiting in the channel of FIG. 19 or 20 or performing a channel change procedure S2240.

In this case, from the procedure of FIG. 19, the human input device 200 can determine that a different network sharing the same frequency band has caused interference and wait until the channel is switched to the idle state without transmitting a trigger packet from the specific channel.

The threshold value is used to distinguish a Bluetooth signal from a signal of the different network, and since power of the Bluetooth signal is very low compared with transmission power of a signal from the different network (for example, Wi-Fi), the Bluetooth transmission signal can be distinguished from a transmission signal of the different network through the threshold value.

Since the procedure of FIG. 22 only compares strength of a measured signal without performing a demodulation procedure, it doesn't have to perform complex calculation such as correlation and requires little energy consumption.

FIG. 23 illustrates one example of resolving inter-interference.

With reference to FIG. 23, the human input device 200 can determine through codeword detection whether the intra-interference has been generated from a different human input device employing Bluetooth communication and perform a procedure to resolve the intra-interference.

More specifically, the human input device 200 can set up a scan point in the listening period or the scan period as shown in FIG. 22.

At the scan point, the human input device 200 can measure energy level of a signal received by the communication unit of the human input device 200 by performing the energy detection procedure S2310. In other words, to determine whether the received signal causes interference on the Bluetooth communication between the human input device 200 and the host device 100, the human input device 200 can measure the power of a received signal.

The human input device 200 can compare the measured energy level with a threshold value predetermined in the human input device 200, S2320, and in case the energy level is lower than the threshold value, the human input device 200 can perform the reconnection procedure described in FIG. 9 or FIG. 10 by transmitting a trigger packet S2330.

However, in case the energy level exceeds the threshold value, the human input device 200 can determine that intra-interference has occurred from a different human input device attempting the Bluetooth reconnection procedure and perform codeword detection S2340.

The threshold value is used to determine whether a different human input device transmits a trigger packet to perform a reconnection procedure with the host device 100.

Through the codeword detection, the human input device 200 can compare the code pattern of a received signal with the codeword set up in the human input device 200, S2340.

In case it is found from the comparison result that the code pattern of the received packet matches the codeword set up in the human input device 200, the human input device 200 can determine that the intra-interference has occurred and perform waiting in a channel or changing the channel S2350, which is the procedure of avoiding interference described in FIG. 19 or 20.

In this case, since the procedure of FIG. 19 deals with interference caused by a different human input device, the human input device 200 can wait in a trigger channel until the reconnection procedure of the different human input device is completed.

The codeword detection has to perform a demodulation procedure to figure out the code pattern. Therefore, although energy consumption in the codeword detection is higher than the energy detection of FIG. 22, the demodulation procedure is simple since the codeword detection relies on repetition of a common pattern and requires little energy consumption compared with generic data reception.

The embodiment of FIG. 23 can be applied for the case in which interference occurs as the human input device 200 described with reference to FIGS. 16 to 17 and a different human input device attempt a reconnection procedure to the same host device.

FIG. 24 is a flow diagram illustrating one example of resolving interference.

With reference to FIG. 24, both of energy detection and codeword detection can be used to resolve both of the inter-interference and intra-interference described in FIG. 22.

More specifically, the human input device can set up a scan point for discovering interference in the listening period or scan period as described with reference to FIG. 22.

The human input device 200 can measure energy level of a signal received by the communication unit of the human input device 200 by performing energy detection at the scan point, which is used to measure power of a received signal to determine occurrence of interference S2410.

The human input device 200 can compare the measured energy level with a first threshold value set up in the human input device 200, S2420; in case the energy level exceeds the first threshold value, the human input device 200 can determine that a different network sharing the same frequency band has caused inter-interference and avoid the inter-interference S2430 by performing waiting in a channel or changing the channel as illustrated in FIG. 23, which is the procedure of avoiding interference described in FIG. 19 or 20.

In this case, since the procedure of FIG. 19 deals with interference caused by a different human input device, the human input device 200 can wait in a trigger channel until the reconnection procedure of the different human input device is completed.

The first threshold value is used to distinguish a Bluetooth signal from a signal of the different network, and since power of the Bluetooth signal is very low compared with transmission power of a signal from the different network (for example, Wi-Fi), the Bluetooth transmission signal can be distinguished from a transmission signal of the different network through the threshold value.

However, in case the measured energy level is lower than the first threshold value, the human input device 200 can determine that the inter-interference has not occurred, set up a second threshold value lower than the first threshold value, and compare the second threshold value with the measured energy level S2240.

If it turns out from the comparison result that the measured energy level is lower than the second threshold value, the human input device 200 can perform a reconnection procedure described in FIG. 9 or 10 by transmitting a trigger packet S2470.

However, if it turns out from the comparison result that the energy level exceeds the second threshold value, the human input device 200 can determine that a different human input device attempting the Bluetooth reconnection procedure has caused intra-interference and perform codeword detection S2450.

The second threshold is used to determine whether a different human input device transmits a trigger packet to perform a reconnection procedure with the host device 100.

Through the codeword detection, the human input device 200 can compare the code pattern of a received signal with the codeword set up in the human input device 200, S2340.

If it turns out from the comparison result that the code pattern of the received pattern matches the codeword set up in the human input device 200, the human input device 200 can determine that the intra-interference has occurred and perform waiting in a channel or changing the channel S2460, which is the procedure of avoiding interference described in FIG. 19 or 20.

In this case, since the procedure of FIG. 19 deals with interference caused by a different human input device, the human input device 200 can wait in a trigger channel until the reconnection procedure of the different human input device is completed.

The procedure above can perform the energy detection and the codeword detection sequentially by setting the first and the second threshold value differently.

Through the method above, the inter-interference and the intra-interference can be distinguished, and the two types of interference can all be resolved by applying separate resolving procedures to the respective types of interference.

FIG. 25 is a flow diagram illustrating another example of a time frame to resolve interference.

With reference to FIG. 25, the human input device 200 can set up a scan point 2510 for discovering and resolving interference in a listening period or beacon scan period and can resolve interference by making the codeword detection and the energy detection described with reference to FIGS. 23 and 24 performed at the respective scan points 1510.

More specifically, the human input device 200 performing a procedure for Bluetooth reconnection can have a listening period before transmitting a trigger packet and perform the codeword detection procedure of FIG. 23 in the listening period 2520.

Since human input devices can perform a reconnection procedure one after another, occurrence of the intra-interference can be inherently avoided if the codeword detection procedure is performed in the listening period.

Afterwards, even if inter-interference occurs, it can be resolved by performing the energy detection procedure 2530 of FIG. 22 in the beacon scan period.

FIG. 26 illustrates one example of changing lengths of a scan interval for performing Bluetooth connection and a normal operation period, to which the present invention is applied.

With reference to FIG. 26, length of a scan period for Bluetooth reconnection and a normal operation period for Bluetooth BR/EDR operation can be set differently for each period.

More specifically, scan periods 2610, 2630, 2650 of the host device 100 are performed only in the host device; the longer the scan periods 2610, 2630, 2650 are set, the more reconnection time of the human input device 200 is reduced, but the normal operation periods 2620, 2640 of the host device 100 get shorter, thereby deteriorating performing of the Bluetooth BR/EDR operation.

On the other hand, if the scan periods 2610, 2630, 2650 are set to be short, performance of Bluetooth BR/EDR can be improved, but the reconnection time can be elongated.

Therefore, to remedy the aforementioned problem, the ratio of a scan period to a normal operation period can be set flexibly according to whether a reconnection procedure has been performed successfully, and the scan period and the normal operation period can be determined according to Eq. 1 below. In what follows, the scan period is denoted as $t_{FPPS}$, and the normal operation period is denoted as $t_{Normal}$.

$$t_{FPPS,1}=1, t_{FPPS,2}=1$$

$$t_{FPPS,n}=t_{FPPS,n-1}+t_{FPPS,n-2}(t_{FPPS,n}<t_{FPPS,MAX})$$

$$t_{Nomal,1}=t_{max}-t_{FPPS,1}=t_{MAX}-1$$

$$t_{Nomal,n}=t_{MAX}-t_{FPPS,n} \quad \text{[Eq. 1]}$$

With reference to Eq. 1, the initial value of $t_{FPPS}$ is set to 1, and the n-th value is defined as $t_{FPPS,\ n}$; in case a reconnection procedure through the FPPS within a single scan period is not completed within a single scan period, n value is increased to elongate the scan period.

As the n value is increased, the scan period is set to be even longer, which allows application of a Fibonacci sequence. The Fibonacci sequence refers to a series of numbers in such a way that the next number is found by addition of preceding two numbers. For example, it is a series of numbers such that 1, 1, 2, 3, 5, 8, 13, 21, 34, . . . .

At this time, since the scan period cannot exceed the size of the initially defined maximum duty cycle, the maximum value of the scan period can be limited to $t_{max}-1$.

Through the procedure above, by setting the scan period and the normal operation period differently for each period, the problem of performance deterioration of Bluetooth communication as the aforementioned scan period is elongated can be resolved.

Various substitutions, modifications, and changes can be made to the present invention described above by those skilled in the art to which the present invention belongs without leaving the technical scope of the present invention; therefore, the present invention is not limited to the embodiments above and appended drawings.

The invention claimed is:

1. A method for preventing collision during a Bluetooth reconnection procedure in a wireless communication system, the method performed by a first device and comprising:
    measuring an energy level of a received signal transmitted through a first channel;
    comparing the energy level with a predetermined threshold value;
    changing the first channel to a second channel, when the energy level is larger than the predetermined threshold value;
    transmitting a trigger packet to a second device through the second channel;
    receiving a beacon packet through the second channel from the second device;
    transmitting a request message requesting a connection to the second device by using Bluetooth communication from the second device through a specific channel;
    receiving a confirm message in response to the request message from the second device through the specific channel; and
    changing to a semi-connected state for transmission of short data,
    wherein the first device stores information related to a Bluetooth connection with the second device.

2. The method of claim 1, wherein the measuring the energy level of the received signal, the comparing the energy level with the predetermined threshold value, and the changing the first channel to the second channel are performed in a listening period for a Bluetooth reconnection.

3. The method of claim 1,
    wherein each of the first channel and the second channel corresponds to one of three channels allocated for the Bluetooth reconnection procedure.

4. The method of claim 1,
    wherein the trigger packet includes a sync word consecutively.

5. The method of claim 1,
wherein information related to Bluetooth connection with the second device includes at least one of a unique address (BD_ADDR) of a Bluetooth module allocated to the first device or a logical transport address (LT_ADDR) allocated to the first device.

6. The method of claim 1,
wherein the request message includes device type information of the first device, and
wherein the device type corresponds to button type or pointing type.

7. The method of claim 1, wherein the confirm message includes at least one of the minimum data transmission number and the data transmission number.

8. The method of claim 7,
wherein the data transmission number is set to the half of the minimum data transmission number, when the first device is of button type and set to the same value as the minimum data transmission number when the first device is of pointing type.

9. The method of claim 8,
wherein the first device increases the data transmission number by one when the first device transmits data to the second device and decreases the data transmission number by one when the first device does not transmit data to the second device.

10. The method of claim 9, wherein the first device switches to connected state when the data transmission number is larger than the minimum data transmission number.

11. A first device for preventing collision during a Bluetooth reconnection procedure in a wireless communication system, the first device comprising:
a communication unit configured to transmit and receive a signal; and
a controller functionally connected to the communication unit, wherein the controller is configured to
measure an energy level of a received signal transmitted through a first channel,
compare the energy level with a predetermined threshold value;
change the first channel to a second channel, when the energy level is larger than the predetermined threshold value,
transmit a trigger packet to a second device through the second channel,
receive a beacon packet from the second device through the second channel,
transmit a request message requesting a connection to the second device by using Bluetooth communication from the second device through a specific channel,
receive a confirm message in response to the request message from the second device through the specific channel, and
change to a semi-connected state for transmission of short data,
wherein the first device stores information related to a Bluetooth connection with the second device.

* * * * *